(12) United States Patent
Newman et al.

(10) Patent No.: US 12,265,165 B2
(45) Date of Patent: Apr. 1, 2025

(54) INTER-VEHICLE SIGNALING FOR COLLISION AVOIDANCE AND HARM MINIMIZATION

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 60 days.

(21) Appl. No.: 18/205,031

(22) Filed: Jun. 2, 2023

(65) Prior Publication Data
US 2023/0349999 A1    Nov. 2, 2023

Related U.S. Application Data

(63) Continuation of application No. 17/828,145, filed on May 31, 2022, now abandoned, which is a continuation of application No. 17/505,031, filed on Oct. 19, 2021, now abandoned, which is a continuation of application No. 17/197,904, filed on Mar. 10, 2021, now abandoned, which is a continuation of application No. 16/945,826, filed on Aug. 1, 2020, now abandoned, which is a continuation of application No. 16/560,355, filed on Sep. 4, 2019, now Pat. No. 10,816,636, which is a
(Continued)

(51) Int. Cl.
*G01S 5/00* (2006.01)
*G07C 5/00* (2006.01)
*G08G 1/16* (2006.01)
*H04W 4/46* (2018.01)

(52) U.S. Cl.
CPC ............ *G01S 5/0072* (2013.01); *G07C 5/008* (2013.01); *G08G 1/163* (2013.01); *G08G 1/166* (2013.01); *H04W 4/46* (2018.02)

(58) Field of Classification Search
CPC ........ G01S 5/0072; H04W 4/46; G07C 5/008; G08G 1/163; G08G 1/166
See application file for complete search history.

(56) References Cited

U.S. PATENT DOCUMENTS

| | | | |
|---|---|---|---|
| 2007/0262574 A1 | 11/2007 | Breed | |
| 2008/0040004 A1* | 2/2008 | Breed | ..................... G01S 7/023 701/45 |

(Continued)

OTHER PUBLICATIONS

Arvin, A Short-Range Infrared Communication for Swarm Mobile Robots, May 15, 2009, Computer Science.

*Primary Examiner* — Truc M Do

(57) ABSTRACT

Inter-vehicle signaling is essential for cooperative collision mitigation. Disclosed are systems and methods for autonomous or semi-autonomous vehicles to identify each other, localize each other, and then cooperate in avoiding a collision if avoidable, and minimizing the harm of the collision if not avoidable. Examples include simultaneous wireless and infrared signals that enable other vehicles to specifically identify each cooperating vehicle, so that an evasion strategy can be developed. Additionally, the signaling can include, in the wireless messages or the infrared signals, or both, the wireless address of the transmitting vehicle, thereby enabling unicast communication and greatly improved coordination thereafter. This system will save lives.

19 Claims, 15 Drawing Sheets

Related U.S. Application Data continuation of application No. 16/390,219, filed on Apr. 22, 2019, now Pat. No. 10,816,635.

(60) Provisional application No. 62/832,499, filed on Apr. 11, 2019, provisional application No. 62/782,672, filed on Dec. 20, 2018.

(56) References Cited

U.S. PATENT DOCUMENTS

| | | | |
|---|---|---|---|
| 2017/0291602 A1* | 10/2017 | Newman | B60W 10/20 |
| 2018/0259967 A1* | 9/2018 | Frazzoli | B60W 30/0956 |
| 2019/0069051 A1* | 2/2019 | Al-Stouhi | H04Q 9/00 |

* cited by examiner

START  A  B  C  1  2  3  END

INTER-VEHICLE SIGNALING FOR COLLISION AVOIDANCE AND HARM MINIMIZATION

PRIORITY CLAIMS AND RELATED APPLICATIONS

This application is a continuation of U.S. application Ser. No. 17/828,145, filed May 31, 2022, which is a continuation of U.S. Application Ser. No. 17,505,031, filed Oct. 19, 2021, which is a continuation of U.S. Application Ser. No. 17,197,904, filed Mar. 10, 2021, which is a continuation of U.S. application Ser. No. 16/945,826, filed Aug. 1, 2020 which is a continuation of U.S. application Ser. No. 16/560,355, filed Sep. 4, 2019 (now U.S. Pat. No. 10,816,636), which is a continuation of U.S. application Ser. No. 16/390,219, filed Apr. 22, 2019 (now U.S. Pat. No. 10,816,635), which claims the benefit of U.S. Provisional Application No. 62/782,672 titled "Infrared Pulse for Autonomous Vehicle Identification" filed Dec. 20, 2018, and U.S. Provisional Application No. 62/832,499 titled "Autonomous Vehicle Localization System" filed Apr. 11, 2019, which are hereby incorporated by reference in entirety. This application is also related to U.S. Pat. No. 9,896,096, issued Feb. 20, 2018 entitled "SYSTEMS AND METHODS FOR HAZARD MITIGATION" and U.S. patent application Ser. No. 16/148,390, filed Oct. 1, 2018 entitled "Blind Spot Potential-Hazard Avoidance System" the contents of which are incorporated herein by reference in their entireties.

FIELD OF THE INVENTION

The invention relates to systems and methods for short range locating and identification of positions of autonomous and semi-autonomous vehicles.

BACKGROUND OF THE INVENTION

Autonomously operated vehicles are expected to cooperate with each other to facilitate the flow of traffic and to reduce traffic accidents, by exchanging wireless messages. However, such cooperation is possible only if the vehicles have determined which wireless address belongs to which of the proximate vehicles. Each vehicle can cooperate with other vehicles after determining the wireless address of each physical vehicle in view. Absent such identification, cooperation is highly limited or impossible.

What is needed is means for determining which physical vehicle, among a plurality of vehicles in traffic, is associated with each wireless address.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for autonomous vehicles to avoid a collision, the method comprising: detecting, by a first autonomous vehicle, based on sensors mounted in or on the first autonomous vehicle, a second vehicle; determining, by a processor of the first autonomous vehicle, that a collision between the first and second autonomous vehicles is imminent; transmitting, by a transmitter of the first autonomous vehicle, a first wireless message indicating a wireless address of the first autonomous vehicle and requesting assistance from the second autonomous vehicle; emitting, by an emitter of the first autonomous vehicle, a first infrared signal simultaneously with the first wireless message; receiving, by a receiver of the first autonomous vehicle, a second wireless message from the second autonomous vehicle, the second wireless message indicating a wireless address of the second autonomous vehicle; and detecting, by one or more infrared detectors in or on the first autonomous vehicle, a second infrared signal emitted by the second autonomous vehicle.

In another aspect, there is a system for avoiding a traffic collision, the system comprising: a first autonomous vehicle comprising: a first wireless transceiver; a first infrared emitter; a first directional infrared detector; and a first processor; and a second autonomous vehicle comprising: a second wireless transceiver; a second infrared emitter; a second directional infrared detector; and a second processor; wherein: the first wireless transceiver is configured to transmit a first wireless message while the first infrared emitter emits a first infrared signal; the second wireless transceiver is configured to transmit a second wireless message while the second infrared emitter emits a second infrared signal; and wherein: the first directional infrared detector is configured to determine a direction of arrival of the second infrared signal; the second directional infrared detector is configured to determine a direction of arrival of the first infrared signal; and wherein: the first processor is configured to determine, according to the direction of arrival of the second infrared signal, which vehicle, among multiple vehicles in traffic, is the second autonomous vehicle; and the second processor is configured to determine, according to the direction of arrival of the first infrared signal, which vehicle, among multiple vehicles in traffic, is the first autonomous vehicle.

In another aspect, there is an emergency intervention system comprising non-transitory computer-readable media in a processor of a first vehicle, the non-transitory computer-readable media containing instructions that, when executed by a computing environment, cause a method to be performed by the first vehicle, the method comprising: while the first vehicle is being driven by a human, automatically receiving an emergency wireless message from a second vehicle, the emergency wireless message indicating an imminent collision; simultaneously with receiving the emergency wireless message, detecting an infrared signal from the second vehicle; determining, according to a direction of arrival of the infrared signal, a direction toward the second vehicle; comparing the direction of arrival of the infrared signal to an image from a visible-light camera of the first vehicle, and thereby determining which particular vehicle in traffic is the second vehicle; responsive to receiving the emergency wireless message, activating an emergency intervention system of the first vehicle; and under control of the emergency intervention system, autonomously performing a series of actions configured to avoid the imminent collision when possible, and to minimize a harm of the imminent collision when avoidance is not possible.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

DETAILED DESCRIPTION

Figure 1:
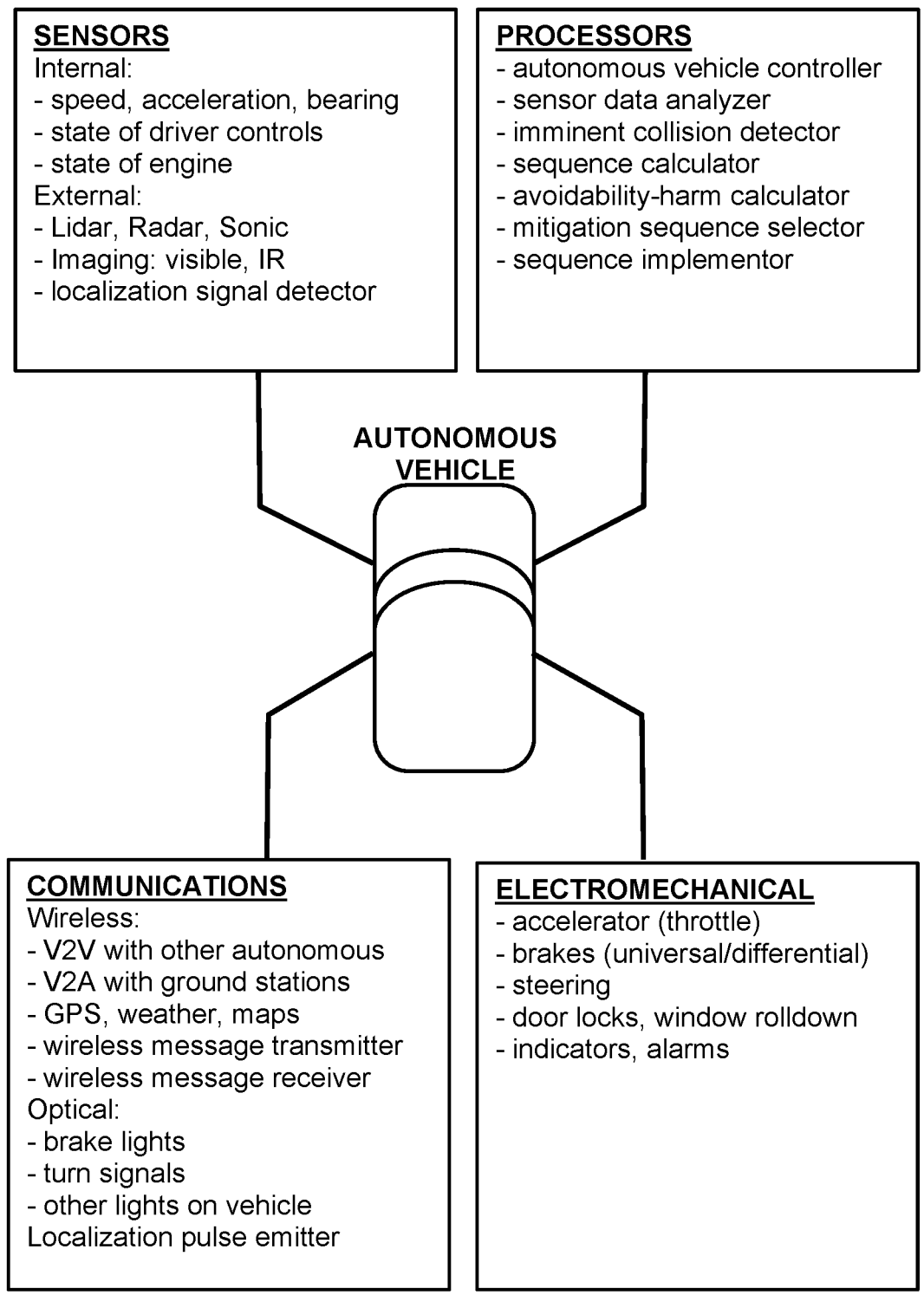
FIG. 1 is a schematic sketch of an exemplary autonomous vehicle denoting various subsystems.

Systems and methods are disclosed that enable autonomously-operated computer-driven vehicles ("autonomous vehicles") to identify and localize other autonomous vehicles in traffic. The disclosed "localization" systems and methods may enable autonomous vehicles to determine which particular vehicle, among other proximate vehicles, is transmitting a particular wireless message. Knowledge of which physical vehicle is associated with each wireless message can greatly enhance the ability of the autonomous vehicles to cooperate with each other in avoiding collisions. Additionally, the systems and methods may enable autonomous vehicles to associate a respective identification code with each of the other vehicles in view. With knowledge of which vehicle is associated with which code, the autonomous vehicles can then communicate more easily and cooperate more effectively in avoiding collisions and regulating the flow of traffic.

The localization systems and methods may include a localization signal comprising pulsed energy which may be emitted by each of the vehicles. The direction of the localization signal may then be determined by the other vehicles, thereby determining the direction of the emitting vehicle. When compared to an image (such as a camera image) that includes the emitting vehicle, the localization signal may thereby determine which particular vehicle, among a plurality of vehicles in view, emitted the localization signal. The localization signal thus may serve as a semaphore indicating which particular vehicle is emitting the localization signal at any particular time. In addition, the localization signal may be coupled with a wireless message, thereby establishing which vehicle is transmitting that particular wireless message; namely, whichever vehicle is also emitting the localization signal associated with the wireless message. For example, the wireless message and the localization signal may be synchronous or simultaneous or otherwise correlated in time. For example, the wireless message and the localization signal may at least partially overlap in time, or the wireless message may occur first with the localization signal beginning as the wireless message ends, or the localization signal may start first and the wireless message may begin as the localization signal ends, or other temporal relationship between the wireless message and the localization signal. Moreover, the localization signal may be emitted synchronously with, or responsive to, a particular icon in the wireless message, such as a word or code or bit pattern or other feature of the wireless message. As used herein, "synchronous" means having a temporal relationship, so that the wireless message and the localization signal are synchronous when they have a temporal relationship with each other.

Each vehicle may have an identification code associated with that vehicle. Preferably each identification code is unique or otherwise protected against duplication among traffic vehicles. The wireless message may contain the identification code of the transmitting vehicle, in which case the other vehicles can receive both the localization signal and the wireless message, and thereby associate the identification code with the particular physical vehicle that synchronously emitted the localization signal. By determining the identification code of each vehicle, the vehicles can subsequently communicate with each other using wireless messages and thereby identify the transmitting vehicle, and optionally the intended recipient as well. For example, the wireless message can mention the identification code of the transmitting vehicle to indicate which vehicle is the source of the message, and may also mention the identification code of a particular recipient vehicle for which the message is intended. In addition, each vehicle may store the identification code of each vehicle in view and, by tracking the other vehicles as they move, may be able to send messages to particular vehicles using the stored identification code values. Thus it may not be necessary to repeat the localization signal upon each wireless message, since the vehicle identification code is included in the wireless message, so long as the identification codes have already been determined by the proximate vehicles.

To consider a particular example, a first vehicle may transmit a wireless message that includes the first vehicle's identification code, and may simultaneously emit a localization signal such as a light pulse. A second vehicle can detect the localization signal using, for example, a camera or a directional detector, and can thereby determine a direction toward the first vehicle relative to the second vehicle. The second vehicle can then compare the direction of the emitting vehicle to an image or other spatial distribution that includes vehicles near or in view of the second vehicle, thereby determining which of those vehicles is the first vehicle. The second vehicle thereby determines which particular vehicle is associated with the concurrent wireless message. Determining which vehicle is associated with which identification code greatly enhances cooperation between the vehicles thus localized. Each of the other vehicles in range can then transmit wireless messages synchronously with localization signals, which the other vehicles can detect and thereby localize each other vehicle. The localization processes may continue until each of the vehicles within range, or within view, or proximate to the first vehicle, have been localized by the other vehicles.

In a first embodiment (Mode-1), each vehicle emits a localization signal upon each wireless message. Other vehicles can determine which vehicle is transmitting each message by detecting the concurrent localization signal. In a second embodiment (Mode-2), each vehicle emits an initial localization signal while synchronously transmitting a wireless message that contains the transmitting vehicle's identification code. Other vehicles can receive the wireless message and the localization signal, record the vehicle identification code from the wireless message, and determine which particular vehicle is associated with that identification code by detecting the localization signal. Each vehicle may communicate wirelessly thereafter, by including their vehicle identification code in each wireless message, without having to repeat the localization process each time. In a third embodiment (Mode-3), each vehicle emits a localization signal that is modulated to encode the emitting vehicle's identification code, with or without a concurrent wireless message. Other vehicles detecting and decoding the encoded localization signal can thereby determine which identification code belongs to the emitting vehicle. Thereafter, the vehicles can communicate wirelessly by including their identification code in each wireless message, without having to repeat the localization signal.

The localization system may include means for transmitting and receiving wireless messages, and means for emitting and detecting pulsed localization signals that indicate the location of the emitting vehicle, and means for determining the direction of each localization signal, and means for comparing the direction of the localization signal to the directions of vehicles in view, thereby determining which vehicle is the emitting vehicle. The system may include a processor configured to control the wireless transmission and reception processes, the localization signal emission and detection processes, and the imaging, direction, and localization determination processes. Each vehicle in range that has a compatible localization system may participate in the localization procedure with each of the other vehicles, thereby enabling communication among them with knowledge of which physical vehicle is transmitting or receiving each message, and thereby enhancing cooperation among the participating vehicles.

While the examples provided herein are primarily directed toward autonomous vehicles, the same systems and methods are applicable to other vehicles that include automatic means for influencing the operation of the vehicle. The systems and methods are applicable to human-driven vehicles equipped with the localization system and semi-autonomous driving assistance systems such as an automatic braking system to avoid front-end collisions, an automatic speed control system to maintain intervehicle distances, an automatic lane-keeping assistant, and the like. The systems and methods are also applicable to vehicles temporarily controlled by processors during, for example, an emergency intervention procedure, and to many other types of vehicles having suitable means for emitting and detecting the localization signals. In addition, the systems and methods may be applicable to vehicles that are entirely human-driven that lack any means for automatically influencing the operation of the vehicle, but which include means for communicating with the driver by, for example, a radio message, focused acoustical energy, etc. In one embodiment, a human-driven vehicle may include an emergency intervention system as well as a localization system according to the present disclosure. A collision may be imminent, but the emergency intervention system may not yet be aware of the hazard. In that case, another vehicle (such as the vehicle that is about to collide with it) may send an urgent wireless message to the human-driven vehicle, thereby prompting the emergency intervention system to immediately assume control and take action to avoid the collision.

A vehicle is "autonomous" if it is operated primarily or solely by a processor. An autonomous vehicle may be operated with little or no participation by a human, other than to specify the destination. Alternatively, the autonomous vehicle may be operated by a processor only temporarily, such as an emergency intervention system that takes control of the vehicle only long enough to avoid a collision, and then returns control back to a human driver. In some embodiments, a vehicle may be semi-autonomous with automatic braking, lane-keeping, speed control, potential-hazard avoidance, and/or blind-spot avoidance systems. In the examples, a "first vehicle" is a particular vehicle in which the localization system is installed. The "second vehicle" is another vehicle proximate to the first vehicle. The second vehicle is "proximate" to the first vehicle if they are close enough to cooperate in avoiding collision. The second vehicle is "within range" of the first vehicle if they can exchange wireless messages. The second vehicle is "in view" of the first vehicle if the sensors (or driver) of the first vehicle can detect visible-light or infrared signals emitted by the second vehicle. The "localization procedure" is a method or process of transmitting wireless messages and associated localization signals to other vehicles, and of receiving wireless messages and localization signals of other vehicles, and determining which vehicle has transmitted each wireless message. "Localizing" a vehicle means determining which particular vehicle, among a plurality of vehicles in view, has emitted a localization signal. Both of the first and second vehicles, and any other vehicles in range, may have a localization system installed and may determine which vehicle is associated with which wireless message. Each vehicle may include an autonomous vehicle controller, such as a processor configured to plan and implement the driving. The autonomous vehicle controller, or other processor, may also be configured to detect an imminent collision, and to cooperate with other autonomous vehicles in avoiding or mitigating the collision. Often in fast-paced freeway conditions, an imminent collision cannot be avoided by vehicles acting on their own, but can be avoided by the cooperative actions of multiple vehicles. Often such cooperation depends on knowing the location and identification of each of the other vehicles. For example, the processor may be configured to select a first sequence of actions for the first vehicle to implement and a second sequence of actions for the second vehicle to implement, so that together they can avoid a traffic collision. Non-emergency traffic flow can also be greatly improved with such vehicle-to-vehicle communication. However, such cooperation depends on each vehicle having determined where each other vehicle is located. If the first vehicle cannot associate each wireless message with a particular vehicle, then cooperation is hindered. The localization systems and methods according to the present disclosure may provide an association between each vehicle's location and its wireless messages.

The vehicle in front of the first vehicle is the "leading vehicle", and the vehicle behind the first vehicle is the "following vehicle". A vehicle encroaching upon the first vehicle from the side is the "encroaching vehicle". Any vehicle in the lane on the opposite side of the first vehicle from the encroaching vehicle is the "opposite vehicle". A vehicle in the lane to the right of the first vehicle is the "right-side" vehicle, and similarly for the left lane. The drivers or autonomous vehicle controllers of the respective vehicles are referred to in the same way, and each lane is referred to in the same way. Each vehicle may be an automobile, a truck, a bus, a motorcycle, or any other motorized conveyance that may travel on a road or highway. Each vehicle may be autonomously driven or human-driven or temporarily controlled by an automatic emergency intervention system for example.

As is well known in physics, the terms "acceleration" and "accelerating" include any change in velocity, including positive, negative, and lateral changes. Although in common usage, people often treat "acceleration" as speeding up, the technically proper meaning includes all velocity changes in any possible direction. Therefore, "acceleration" as used herein includes "positive acceleration" or speeding up in which the forward speed of the subject vehicle is increased, "passive deceleration" in which the forward speed of the subject vehicle is reduced by reducing the engine power, "active deceleration" or "braking" by applying the brakes, and "lateral acceleration" or "steering" in which the direction of the subject vehicle's motion is changed. In practice, positive acceleration is caused by depressing the accelerator pedal, negative acceleration or deceleration is caused by depressing the brake pedal or releasing the accelerator pedal, and lateral acceleration or steering is caused by turning the steering wheel. Thus, the general term "acceleration" includes speeding up, slowing down, and changing the direction of the subject vehicle's motion.

A "strategy" is a plan comprising a sequence of actions in a particular order, configured to accomplish a specific purpose, for example to avoid a collision or to minimize its harm. A "sequence" or "sequence of actions" or "set of sequential actions" comprises one or more actions, such as acceleration or deceleration or steering actions or waiting periods, in a particular order. The sequence may further include a specification of the magnitude of each action in the sequence, as well as its duration and timing. The actions may overlap in time, such as braking and steering at the same time. The actions may further include any other item, behavior, or effect that the processor can initiate, such as illuminating the brake lights, sounding the horn, sending a message, activating a dashboard indicator, adjusting a sensor, performing a calculation, reporting a result, setting a parameter, and so forth. The sequence of actions may include thresholds (such as "accelerate until matching the leading vehicle") and/or contingencies (such as "illuminate brake lights if the leading vehicle slows down"). The sequence may include branches (such as "if the following vehicle continues to accelerate, switch to the harm-minimization strategy"). The sequence of actions may be implemented by a processor sending control signals to control the vehicle throttle, brakes, and steering, and optionally the lights and other controls. Preferably, the control signals are adjusted by feedback, in which sensors measure the position, velocity, or acceleration of the vehicle, and any deviation from the expected trajectory would cause the processor to revise the control signals in a way to bring the vehicle motion into agreement with the predetermined sequence of actions. "Direct mitigation" comprises controlling the throttle, brakes, and steering of the vehicle according to the selected sequence, with or without feedback from the internal sensor data. "Indirect mitigation" comprises controlling anything else, such as turning off the fuel pump, rolling down the windows, flashing the brake lights, sounding the horn, alerting the driver or occupants, sending a help-request message, and the like.

The "harm" of a collision includes negative consequences of the collision, preferably quantified according to a valuation scheme. Such a scheme may place high value on saving lives, a lower but still high value on preventing injuries, and also a value on any physical damage caused by the collision. Then the overall harm of the expected collision may be quantified by multiplying each type of harm times its valuation, and then adding together all the types of harms expected for the collision. The various types of harm may also be multiplied by probability factors to account for uncertainties. Thus, a harm calculation related to an imminent high-speed collision may include an entry for possible loss of lives, whereas a low-speed collision may include mainly property damage costs. As used herein, the "minimum-harm sequence" is a particular sequence of actions that is expected to produce less harm than the other sequences so far analyzed.

Turning now to the figures, FIG. 1 is a schematic of an exemplary autonomous vehicle including sensors, processors, communications systems, and electromechanical systems. The sensors may include internal sensors configured to measure the speed, acceleration, and/or bearing of the vehicle, the state of the engine, and/or the state of any human-operated controls such as the steering wheel, accelerator pedal, and brake pedal, among other controls. The sensors may also include external sensors configured to measure data about other vehicles such as lidar, radar, sonic, and/or Doppler systems to measure distances and/or speeds of other vehicles, cameras in visible and/or infrared light, and any other sensors on the vehicle.

The processors may include one or more physical processing modules, configured to autonomously operate the first vehicle. The processors may be configured to drive the vehicle in normal traffic and/or in emergency conditions. The processors may include a processor configured to plan and implement a driving route autonomously, according to a destination and route preferences that are specified by a human occupant. The processors may include a processor configured to detect other vehicles, a processor configured to project traffic motions forward in time and thereby to detect an imminent collision, and a processor configured to devise and calculate sequences of actions such as accelerations, decelerations, and steering of the vehicle. The processors may further include a processor configured to determine whether an imminent collision is avoidable if the vehicle were driven according to each of the sequences, and/or if the other vehicle or vehicles were driven according to various sequences. The processor may be further configured to determine that the collision is unavoidable if none of the sequences can avoid the collision. A processor may be configured to calculate the harm of a collision according to the projected collision parameters such as the relative velocity of the colliding vehicles, the strike points on both vehicles, and other data affecting the collision. A processor may be configured to calculate the harm according to a formula that may include the number of expected fatalities, injuries, and/or property damage, optionally weighted by suitable coefficients and/or probability functions. When the collision is avoidable, a processor may be configured to select a particular avoidance sequence which is a sequence of actions that is calculated to avoid the collision. When the collision is unavoidable, a processor may be configured to select a least-harm sequence which is a sequence of actions that is calculated to result in the least harm. A processor may be configured to implement the selected sequence of actions by transmitting suitable signals to the accelerator or throttle, brakes, and/or steering of the vehicle according to the selected sequence.

The processors may comprise a computing environment optionally associated with non-transitory computer-readable media. The computing environment may include a computer, CPU, GPU, microprocessor, microcontroller, digital signal processor, ASIC, or other digital electronic device capable of analyzing data from sensors and preparing a collision-avoidance or a harm-minimization sequence of actions, which may include controlling the acceleration or deceleration or steering of the subject vehicle according to the sequence of actions. The computing environment may include one or more processors, each processor being configured to perform one or more of the computing tasks, including such tasks as autonomously driving the subject vehicle, analyzing sensor data, calculating future positions of vehicles, calculating the harm associated with a possible collision, determining whether an imminent collision is avoidable or unavoidable, selecting a sequence of actions to implement, and implementing the sequence of actions by transmitting control signals to the accelerator, brakes, steering, etc. The non-transitory computer-readable media comprise any digital data storage media capable of storing instructions such as software instructions that, when executed, cause the computing environment to perform a method for mitigating vehicle collisions, including avoiding a collision when possible and minimizing the harm of a collision when unavoidable. Examples of such media include rotating media such as disk drives and CD's, solid-state drives, permanently configured ROM, detachable memories such as removable drives and micro-SD memories, and the like, in contrast to transitory media such as a computer's working memory (RAM, DRAM, cache RAM, buffers, and the like).

The processors may include a processor configured to analyze wireless messages, and/or a processor configured to analyze localization signals from other vehicles. A processor may be configured to determine which vehicle, among a plurality of vehicles proximate to the first vehicle, transmitted the wireless message. A processor may be configured to extract and record a vehicle identification code contained in the wireless message or in the localization signal. A processor may be configured to analyze a camera image or other directional detector data. A processor may detect vehicles proximate to the first vehicle in the image or the detector data. A processor may detect a localization signal in the image or the detector data, and to spatially correlate the localization signal with a particular one of the other vehicles proximate to the first vehicle, thereby determining which of the other vehicles emitted the localization signal. The image or directional data may include both the localization signal and the proximate vehicles; alternatively, the vehicles may be imaged separately from the localization signal and subsequently correlated by, for example, image analysis. A processor may be configured to track or follow the position or direction of another vehicle using, for example, image processing or other suitable time-sequential measurement means. A processor may be configured to associate wireless messages that include a particular vehicle identification code with a particular vehicle that was previously localized using an earlier localization signal.

The communications module may include wireless means for V2V (vehicle-to-vehicle) communication between autonomous vehicles, V2A (vehicle-to-anyone) communications with non-vehicle receivers such as first responders for example. The communication module may further include receivers such as GPS and internet receivers for weather and map data, and the like. The communications module may include a wireless transmitter and a wireless receiver such as a radio-frequency transceiver. The communications module may further include optical communication means such as a light pulse or infrared pulse emitter, configured to emit a vehicle localization signal, such as a visible or infrared light pulse or series of such pulses. The communications module may further include a localization signal detector configured to detect localization signals such as visible or infrared pulses. The localization signal detector may be an imaging-type detector, or a directional detector, or otherwise configured to determine the direction of a localization signal. The communications module may include means for operating the horn, brake lights, and other lights aboard the vehicle.

Means for wireless communication may include radio-frequency transmitters and receivers. Optical imaging means may include still or video cameras sensitive to infrared and/or visible light. The optical imaging means may be sensitive to the localization signal, and may thereby determine the direction of the emitting vehicle by detecting the direction of the localization signal. Alternatively, the optical imaging means may be sensitive to vehicles but insensitive to the localization signals, in which case a separate localization signal detector may be included. If so, such a localization signal detector may be a directional detector configured to determine the direction of an arriving localization signal. Means for emitting localization signals may include light-emitting diodes (LEDs) or other types of lamps, configured to emit one or more pulses, in the infrared or visible or other light bands.

The localization signal may comprise pulsed energy. For example, the localization signal may include one or more electromagnetic energy pulses, such as an infrared or visible light pulse or a series of such pulses. The localization signal detector may be an imaging type sensor such as a camera or a plurality of cameras, or a non-imaging directional detector or a plurality of such detectors, or other suitable detector configured to determine the direction of the localization signal. The localization signal detector may be configured to image the second vehicle concurrently with the localization signal on the same image, such as an image that records both visible and infrared light, thereby determining directly from the image which vehicle is the emitting vehicle. Alternatively, the localization signal detector may be configured to measure the direction of the localization signal, while a separate imager is configured to image the second vehicle, in which case the processor may be configured to correlate the measured direction of the localization signal with the particular vehicle in the image that is in the same direction as the localization signal, and thereby determine which vehicle is associated with which identification code.

The vehicle identification code is a code or data suitable for identifying each vehicle among other vehicles in traffic. The vehicle identification code may be the license plate code, the VIN number, a random alphanumeric string, or other vehicle-identifying code. Preferably each vehicle has a unique identification code, or at least each code is sufficiently detailed that two vehicles with the same identification code would be unlikely to be in range of each other. In some embodiments, a particular vehicle may be configured to determine when another vehicle has the same identification code as the particular vehicle, and responsively may change its identification code permanently by, for example, adding a randomly selected number or letter to the end of its code. In this way, each vehicle can detect when another vehicle asserts the same identification code in a wireless message and can then revise its own identification code, thereby providing that each vehicle can continue to have different codes thereafter. Each vehicle may transmit its identification code in a wireless message. Each vehicle may emit a localization signal that includes the identification code encoded in, for example, a sequence of pulses. Each vehicle may transmit a wireless message and a localization signal concurrently, or synchronously, or otherwise in a way that associates the wireless message with the localization signal. For example, the localization signal may be emitted during the wireless message, such as continuously or periodically during the wireless message, or the localization signal may be emitted upon a particular word such as "now" or other indicator within the wireless message, or at the beginning or the end of the wireless message. Other vehicles may receive the localization signal and the identification code concurrently, and may thereby associate the wireless message with the emitting vehicle. In addition, vehicles that detect the localization signal and the associated vehicle identification code may record that association in, for example, computer memory, or the like. After localizing a second vehicle, a first vehicle can then track the location of the second vehicle using, for example, cameras. In addition, the first vehicle can send a wireless communication specifically to the second vehicle by referring to the second vehicle's identification code in the wireless message, including an indication that the message is intended for the second vehicle. The first vehicle can also indicate that the wireless message is from the first vehicle by including the first vehicle's identification code in the wireless message, along with an indication that the message is from the first vehicle.

The first vehicle can direct a wireless message specifically to the second vehicle and also show that the message is from the first vehicle by including the first vehicle's identification code in the message with an indication that the first vehicle is the transmitting vehicle, and by including the second vehicle's identification code in the message with an indication that the second vehicle is the intended recipient of the message. With such specificity in communication, the vehicles can cooperate with each other to facilitate the flow of traffic, avoid potential hazards, avoid collisions, and/or minimize the harm of unavoidable collisions.

The electromechanical module may include means for driving and controlling the vehicle. For example, the driving and controlling means may include electrical, mechanical, hydraulic, and/or other types of linkages configured to adjust the accelerator or throttle of the vehicle, linkages to apply the brakes including controlling the brake pressure and optionally controlling the brakes of each wheel separately, and linkages to control the steering. The electromechanical module may further include means for releasing the door locks, rolling down the windows to permit escape, turning off the engine and fuel pump, turning on the interior lights, and other items to assist the occupants in an emergency. The electromechanical module may further include indicators and alarms and the like to inform the occupants of any problems.

Figure 2:
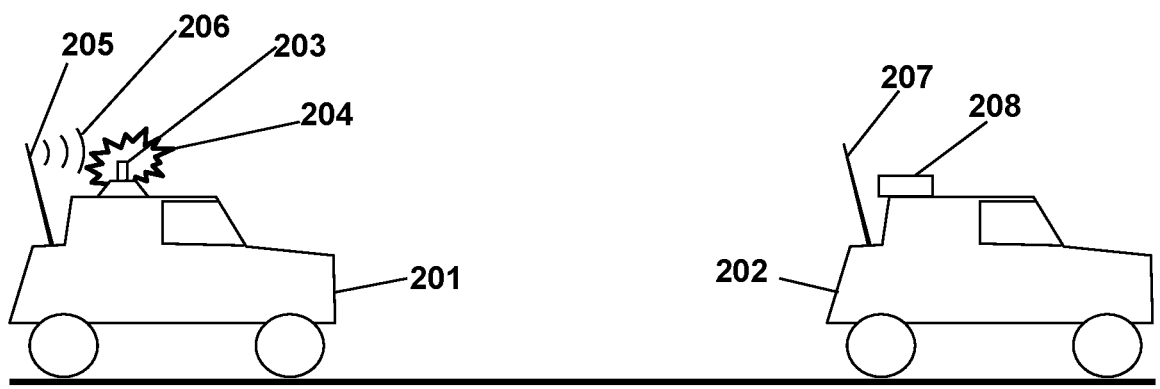
FIG. 2 is a sketch showing two vehicles configured with exemplary localization systems.

FIG. 2 shows schematically two vehicles performing an exemplary localization procedure. The first vehicle 201 includes a wireless transmitter 205 transmitting a wireless message 206. The wireless message 206 in this case is a "hailing" message, which is a wireless message that invites other vehicles to perform a localization procedure. The hailing message, and preferably each wireless message from each vehicle, may include the identification code of the transmitting vehicle. The second vehicle 202 includes a wireless receiver 207 configured to receive the hailing message 206 and other wireless messages. The first vehicle 201 is further equipped with a localization signal emitter 203, which emits a localization signal 204 such as an infrared flash. Typically, the localization signal 204 is simultaneous with, or synchronous with, or otherwise associated with, the wireless message 206 that contains the first vehicle's identification code. Other vehicles can then detect the localization signal 204 and thereby determine which vehicle in traffic is associated with that particular identification code, and thereby determine which particular vehicle is the first vehicle 201. After localizing each of the other vehicles, and determining which of the physical vehicles is associated with which of the identification codes, each vehicle can thereafter collaborate and cooperate far more effectively to avoid hazards.

In the diagram, the second vehicle 202 is equipped with a localization signal detector 208 such as an infrared camera, and can thereby localize the first vehicle 201 spatially, and thereby determine that the first vehicle 201 is the source of the localization signal 204. Additionally, the second vehicle 202 includes a wireless receiver 207, and can thereby associate the first vehicle's identification code with the direction of the first vehicle 201, and thereby identify and localize the first vehicle 201.

After determining the location of the first vehicle 201 (by imaging the localization signal 204) and determining the first vehicle's identification code (by receiving a concurrent wireless message 206), the second vehicle 202 can then communicate with the first vehicle 201 with knowledge of the first vehicle's location relative to the second vehicle 202. In addition, the second vehicle 202 can continue to track the first vehicle 201 optically, using visible light imagers or infrared cameras for example, thereby determining where the first vehicle 201 is positioned relative to the second vehicle 202 as long as the first vehicle 201 remains in view. If the second vehicle 202 loses track of the first vehicle 201, the second vehicle 202 can transmit a wireless message to the first vehicle 201 requesting that the first vehicle 201 again emit its localization signal. The second vehicle 202 can include the first vehicle's identification code in the message so as to specify that the first vehicle 201 is the intended recipient of the message, and can also include the second vehicle's identification code in the message with an indication that this is the transmitting vehicle's code.

It is generally not feasible to direct a wireless message to a particular vehicle by forming a collimated or directed electromagnetic beam at wireless frequencies. Beam-forming generally requires high frequencies and/or large rotatable antennas, both of which are expensive and cumbersome. Instead, a vehicle can send a wireless message specifically to another vehicle by broadcasting the message omnidirectionally, and including the identification code of the intended recipient in the message. Other vehicles that pick up the message can then determine, from the identification code, that the message is not intended for them, and can ignore it.

Figure 3A:
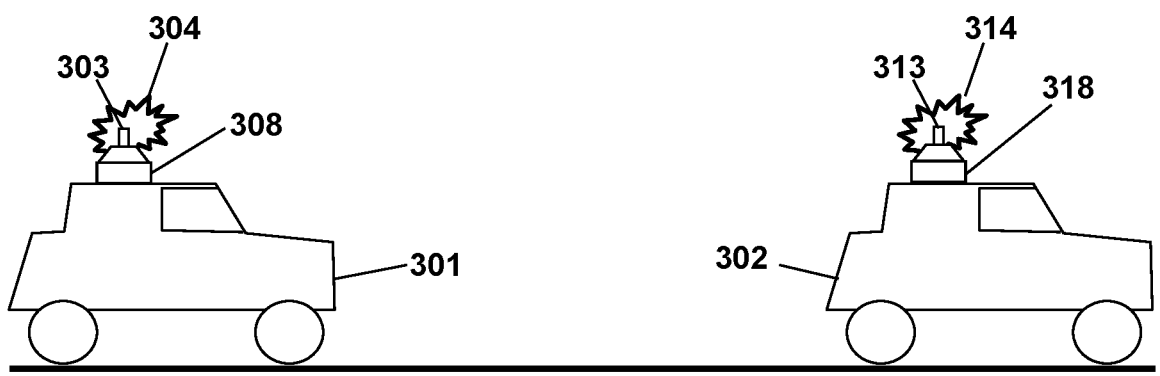
FIG. 3A is a sketch showing two vehicles configured with another exemplary localization system.

FIG. 3A shows two vehicles exchanging localization signals, but in this case the vehicle identification code is encoded within the localization signal itself, rather than being transmitted by a separate wireless message. A first vehicle 301 includes a localization signal emitter 303, which is emitting a localization signal 304 that includes the first vehicle's identification code embedded or encoded within the localization signal 304. For example, the localization signal 304 may comprise a series of short and long pulses, or pulses with short and long interpulse intervals, or other modulation configured to convey or indicate the identification code of the first vehicle 301. The encoding may be in the form of Morse code, or ASCII, or BCD, or straight binary, or one of the many six-bit encodings, or other suitable encoding protocol that includes the symbols or elements of the emitting vehicle's identification code. For example, if the vehicle identification code is its VIN number or its license plate symbols, then the localization signal emitter 303 may be modulated so as to encode the symbols of the first vehicle's license plate or VIN. The encoded localization signal 304 may further include a state or province symbol and/or country code to further reduce the likelihood of coincidental matches in two vehicle identification codes. The localization signal 304 may also include a Start-symbol and an End-symbol indicating the start and end of the encoded message, or a formatting or operational symbol, or other symbols for various purposes.

The first vehicle 301 may include a localization signal detector 308 configured to detect encoded localization signals from other vehicles, thereby reading the identification code contained in the localization signal 314. The localization signal detector 308 may be a directional detector that indicates the direction of the second vehicle 302, or an imaging type detector such as a camera, or it may be a non-directional detector that merely reads the localization signal code pulses, while a different sensor determines the direction of the localization signal 314 without reading the individual pulses. Some directional detectors have insufficient time resolution to resolve the individual pulses, while some high-speed detectors lack imaging capability, but the combination of a fast non-directional detector with a slower directional detector may acquire the pulse-coded information and the directional information at the same time. The first vehicle 301 determines which of the other vehicles is associated with which identification code according to the modulation pattern of each received localization signal. One advantage of providing two separate sensors—a fast sensor to detect the individual pulses of the localization signal, and a separate imaging detector that determines the spatial location of the emitting vehicle—may be to reduce costs, since an imaging system with fast time resolution may be more expensive than the two separate units. Many cameras cannot follow a rapidly-varying pulsed signal.

The second vehicle 302 also includes a second localization signal emitter 313 configured to emit coded localization signals 314 in which the second vehicle's identification code is embedded. The second vehicle 302 may also include an imaging localization signal detector 318. Thus, the second vehicle 302 can determine which vehicle, of several proximate vehicles, is the first vehicle 301 according to the location of the first localization pulse 304 on an image produced by the imaging localization pulse detector 318. In this way, the second vehicle 302 localizes the first vehicle 301 and associates the first vehicle's identification code with the first vehicle 301.

Although hailing messages and other wireless messages were not involved in exchanging the coded localization signals 304-314 in this example, subsequent wireless communication may be exchanged between the two vehicles 301-302 after they are localized and their identification codes exchanged. Thus, the two vehicles 301-302 can cooperate in solving traffic problems by exchanging wireless messages that include their respective identification codes, without further localization signals, unless they are needed to re-localize their respective positions.

Figure 3B:
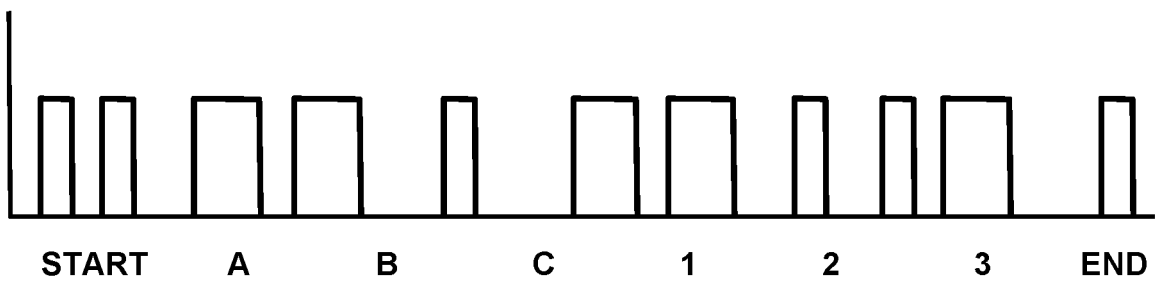
FIG. 3B is a schematic showing exemplary pulses comprising an autonomous vehicle identification and localization signal.

FIG. 3B is a notional schematic showing a series of pulses such as infrared or visible light pulses comprising a coded localization signal. As an example, the vehicle identification code may be the license plate code of the emitting vehicle, which in this case is "ABC123". The exemplary coded localization signal includes a "Start" code, followed by the codes for the letters and numbers of the license plate, and terminated by an "End" code. In this notional example, the Start code is two short pulses with a small separation, the End code is a single short pulse after a long space, and the various letters and numbers are indicated by various long and short pulses with long or short interpulse spaces. The pulses may have any duration, but typically are very brief. For example, the short pulses may be 1 microsecond long and the long pulses may be 2 microseconds long, and likewise the interpulse periods may be 1 and 2 microsecond respectively. In that case, a localization signal comprising a Start symbol, seven license plate symbols (or other number of symbols as per respective state and/or country requirements), and an End symbol, and optionally a state or province indicator, may be completed in a very short time such as 50-100 microseconds, depending on the encoding protocol used. In another exemplary system, the short pulses may be 1 microsecond in duration and the long pulses may be 2 microseconds, and the entire localization message may occupy a time of less than 1 millisecond. In other embodiments, the duration of the localization signal may be less than 0.1 second or less than 1 second, depending on encoding details.

No specific coding is implied by the notional graphic depicted. Many different coding protocols are possible. Preferably, all autonomous vehicles should use the same encoding protocol so that they can interpret other vehicles' coded localization signals, or at least should be configured to correctly decode the encoded localization signals of the other vehicles if they use different encoding standards. An advantage of embedding the identification code into the optical localization signals, rather than in a separate wireless signal, may be to avoid cluttering the radio band with unnecessary wireless messages. If the coded localization signal is garbled or otherwise not decipherable to another vehicle, then that other vehicle can transmit a wireless message requesting that the coded localization signal should be repeated, or alternatively requesting that the code be sent by wireless message instead.

As a further option, the localization signal emitter may be configured to emit coded signals other than vehicle identification codes. For example, after detecting an imminent collision, a vehicle may emit a signal encoding "SOS" or "STOP" or other agreed-upon code to warn other vehicles to keep away.

Figure 4A:
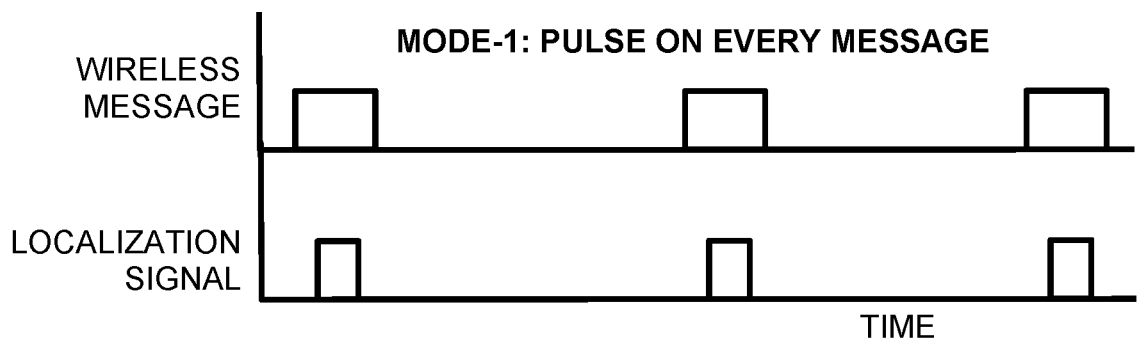
FIG. 4A is a schematic showing an exemplary sequence of wireless messages and localization pulses versus time.

FIG. 4A is a schematic showing an exemplary sequence of wireless messages and localization signals versus time. Depicted is a Mode-1 localization procedure in which a non-coded localization signal is emitted synchronously with each wireless message. Accordingly, the schematic shows three wireless messages spaced apart in time, and three localization signals emitted concurrently with the wireless messages. Other vehicles can receive the wireless messages and can detect the localization signals, and thereby determine which vehicle is transmitting each wireless signal. In Mode-1, no vehicle identification codes are required because each message includes a concurrent, or otherwise synchronous, localization signal.

Figure 4B:
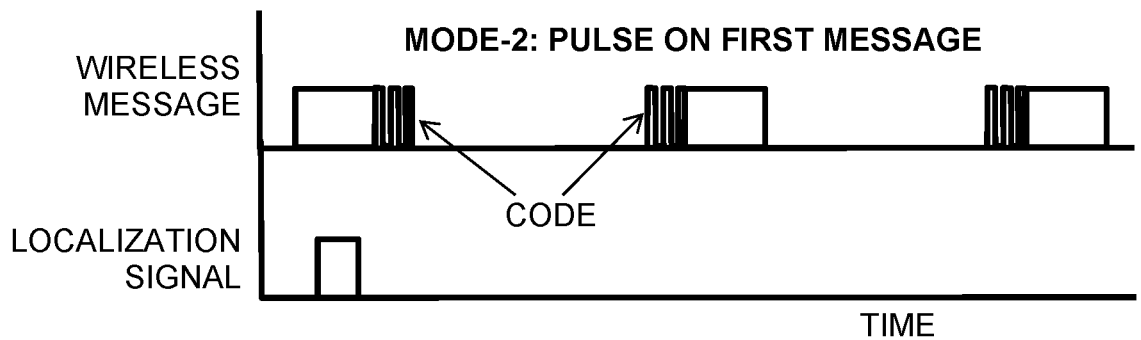
FIG. 4B is a schematic showing another exemplary sequence of wireless messages and localization pulses versus time.

FIG. 4B is a schematic showing another exemplary sequence of wireless messages and localization signals versus time. Depicted is a Mode-2 localization procedure in which each wireless message includes the vehicle identification code of the transmitting vehicle. A localization signal is emitted synchronously with the first wireless message, and subsequent wireless messages do not have an associated localization signal. Instead, a receiving vehicle can determine the location of the transmitting vehicle with the first message, according to the direction of the associated localization signal, and can record the identification code received in the message. Then, upon receiving subsequent messages that include the same code, the receiving vehicles can determine thereby that the same transmitting vehicle is involved.

The vehicle identification code may be included in a wireless message at the beginning, or the end, or within the wireless message along with an indicator that indicates that the code is the transmitting vehicle's identification code. The transmitting vehicle can also send wireless messages without the code, but in that case the receiving vehicles have no way to determine which vehicle the messages are coming from (unless the transmitting vehicle again emits a localization pulse).

Figure 4C:
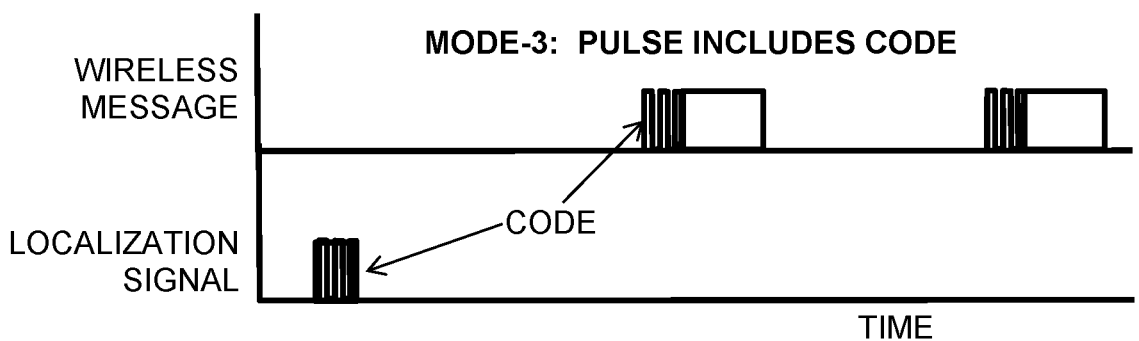
FIG. 4C is a schematic showing another exemplary sequence of wireless messages and localization pulses versus time.

FIG. 4C is a schematic showing another exemplary sequence of wireless messages and localization signals versus time. Depicted is a Mode-3 localization procedure in which the transmitting vehicle's identification code is embedded in a localization signal, for example by modulating a visible or infrared signal. Other vehicles can detect the localization signal, and decode the embedded vehicle identification code, and thereby determine the location of the emitting vehicle and also record the identification code of the emitting vehicle. As shown, there is no wireless message associated with the localization signal. Communicating the vehicle identification code optically, rather than by a wireless message, may prevent overloading of the radiofrequency spectrum while efficiently broadcasting each vehicle's location and identification to other vehicles. Subsequently, wireless messages are then transmitted by the emitting vehicle. The identification code, as revealed in the initial localization signal, is then included in each wireless message. No further localization signals may be needed, since other vehicles have already determined which vehicle has the identification code initially emitted. However, if a new set of vehicles arrives in view, the coded localization signal may again be emitted to localize the new arrivals.

Figure 5:
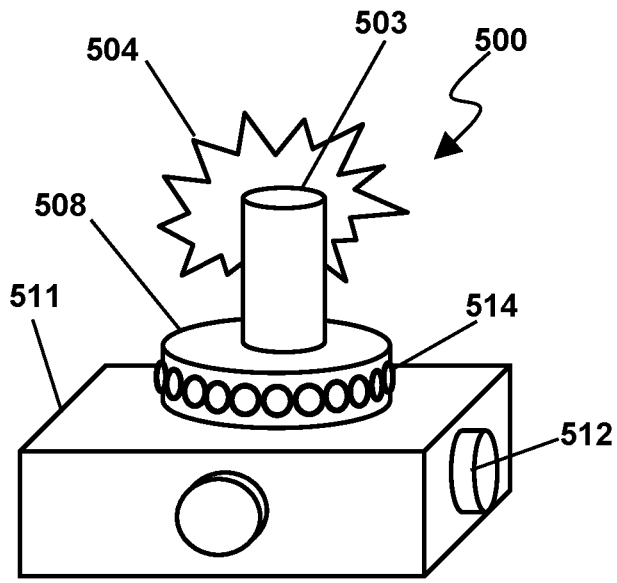
FIG. 5 is a sketch in perspective showing an exemplary localization system.

FIG. 5 is a perspective sketch of an exemplary localization system 500, which may be mounted on a first vehicle (not shown), and configured to emit and receive localization signals. The localization system 500 may include a localization signal emitter 503 configured to emit a localization signal 504. For example, the localization signal 504 may include one or more pulses of visible or infrared light, and the localization signal emitter 503 may include one or more LEDs or other lamps. In some embodiments, the localization signal emitter 503 may extend substantially around 360 degrees and may thereby emit the localization signal 504 substantially all around the subject vehicle, thereby being visible to other vehicles regardless of their azimuthal position relative to the first vehicle. Such an emitter is "omnidirectional" if the emitted signal energy is distributed throughout all or substantially all horizontal directions. A single central emitter 703 may be provided as shown, or alternatively, a plurality of emitters may be provided, such as two emitters on the ends of a vehicle and configured to emit around 180 degrees each, or four emitters on the corners of the vehicle and configured to emit around 90 degrees, or other combination that, together, covers all or substantially all of a 360-degree range.

The localization system 500 may further include a localization signal detector 508. The detector 508 may be an omnidirectional detector which is configured to detect localization signals from all or substantially all horizontal directions. Alternatively, the detector may comprise a plurality of separate detectors positioned around the vehicle and configured to detect localization signals from all, or substantially all, directions. In addition, the localization signal detector 508 may be a high-speed optical pulse detector, configured to detect the individual pulses of a pulse-coded localization signal from other autonomous vehicles. The main purpose of the detector 508 may be to detect localization signals with sufficient time resolution to resolve individual pulses and thereby to read the vehicle identification code which is embedded or encoded or modulated in the localization signal. In some embodiments, the detector 508 may be further configured to determine the direction of the localization signal. For example, the direction-sensitive localization signal detector 508 may include a large number of photodiodes 514, each configured to detect light in the wavelength of the localization signal, and distributed around the detector 508 with each photodiode 514 being aimed or focused or collimated in a different horizontal direction. The detector 508 may thereby detect localization signals substantially all around the horizontal plane, and also may indicate the direction of the emitting vehicle according to which of the photodiodes 514 registered the detection. Photodiodes sensitive to visible and/or infrared light with sub-microsecond time resolution are readily available.

The localization system 500 may further include an imaging device 511, which may have lenses 512 pointing in various directions, configured to form images of traffic around the subject vehicle. Thus, the imaging device 511 may detect the various vehicles and their locations or directions, while the directional detector 508 may detect the incoming localization signal and its direction according to which photodiode 514 was activated. Thus, the localization system 500 can determine which vehicle emitted the localization signal. In addition, by correlating the image with the code that was observed by the detector 508, the emitting vehicle's identification code can be correlated with the physical vehicle that was recorded in the image. Concordance of the localization signal with one of the imaged vehicles can thereby determine both the identification code and the spatial location of that emitting vehicle.

To consider a specific example, the localization signal 504, and each localization signal from the other vehicles, may comprise a plurality of brief pulses in which the emitting vehicle's identification code is embedded. The localization signal emitter 503 may include a sufficient number of infrared LEDs pointing around the subject vehicle to cover substantially all horizontal directions. The localization signal detector 508 may include a sufficient number of infrared-sensitive photodiodes or phototransistors or other suitable detector components 514, distributed around the periphery and pointed in various directions to detect localization signal coming from substantially any direction around the first vehicle. Each detector component 514 may be configured to have sufficient time resolution and sensitivity to resolve individual pulses of the incoming coded localization signals. The imager 511 may be a visible-light camera or a near-infrared camera or other suitable imaging device, configured to image vehicles around the first vehicle and determine the spatial locations of those vehicles.

As an alternative, the localization signal emitter 503 may have a single infrared source along with a conical reflector or other optical elements configured to distribute the localization signal 504 horizontally around the first vehicle. Other suitable optical arrangements are well known.

Figure 6:
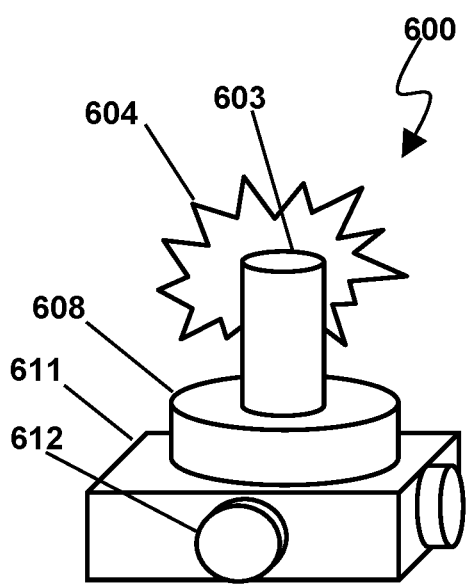
FIG. 6 is a sketch in perspective showing another exemplary localization system.

FIG. 6 is a perspective sketch of another exemplary localization system 600. In this example, the vehicle identification code is again embedded in the localization signal. However, the localization signal detector is not directional; instead it is configured to read the incoming identification codes omnidirectionally. At the same time, an imager such as a camera is sensitive to the localization signal and also to the various vehicles in view. The imager thereby images both the localization signal flash and the vehicles in a single image, and thereby identifies the emitting vehicle as the one with the flash upon it.

More specifically, the localization system 600 may include an omnidirectional emitter 603 configured to emit a localization signal 604 that includes an identification code therein. In addition, a high-speed omnidirectional detector 608 may be configured to detect other vehicles' localization signals and to read the codes therein, such as measuring the width and timing of a series of pulses comprising the incoming localization signals. Thus, the detector 608 may read the code but, since it is omnidirectional, the detector 608 does not determine which vehicle emitted the code, in this example. Concurrently, an imager 611 such as a camera with lenses 612 may be configured to record both the vehicles and the localization signal on the same image. The localization signal may appear as a flash superposed on one of the vehicles. For example, the imager 611 may be a camera sensitive to both visible and infrared light. Thus, the imager 611 may determine which particular vehicle emitted the localization signal, while the detector 608 reads the code. Thus, the emitting vehicle's location and code are determined. Imaging devices typically record a scene in frames by accumulating light or other energy during a predetermined brief interval. In that case, the incoming localization signal (which may be very brief) may appear in only a single frame, such as the frame which was acquired when the fast localization signal was detected by the detector 608. By seeking the location of a single-frame transient feature synchronous with the detected localization signal, the system 600 can thereby determine which vehicle emitted the localization signal.

Figure 7:
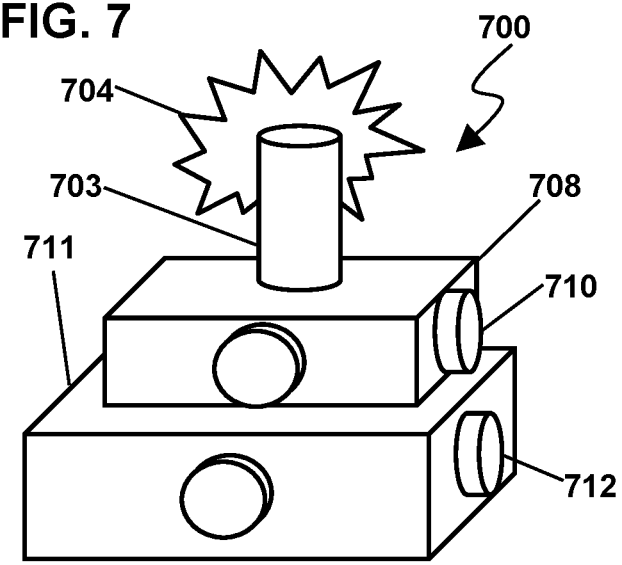
FIG. 7 is a sketch in perspective showing a different exemplary localization system.

FIG. 7 is a perspective sketch of an exemplary localization system configured to image the traffic and an incoming non-coded localization signal with two separate imaging devices. The system 700 includes a localization signal emitter 703 emitting a localization signal 704 such as an infrared flash. In this embodiment, the localization signal 704 is pulsed but is not encoded; instead, the vehicle identification signal is provided separately by a concurrent wireless message.

The system 700 further includes two imaging devices: a localization signal imaging device 708 such as an infrared camera, and a vehicle imaging device 711 such as a visible-light camera. The localization signal imaging device 708 may be configured with lenses 710 to view around the first vehicle to detect and image localization signals from other vehicles. The vehicle imaging device 711 may be configured with lenses 712 to view around the first vehicle to detect the direction or location of other vehicles, and specifically whichever vehicle is emitting the localization signal that the localization signal imaging device 708 has detected. By correlating the visible and infrared images, the depicted system 700 may localize the emitting vehicle spatially, and by correlating that vehicle with a vehicle identification code, provided in a concurrent or synchronous wireless message, that vehicle identification code can be associated with the emitting vehicle. In addition, the system 700 may track the vehicle so identified using, for example, the vehicle imaging device 711, and the system 700 may maintain and update the direction or positional information about the identified vehicle as it moves through traffic.

Figure 8:
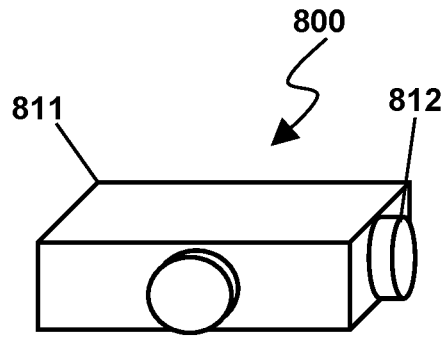
FIG. 8 is a sketch in perspective showing an exemplary simplified localization system.

FIG. 8 is a perspective sketch of an even simpler exemplary localization system 800 in which a vehicle's turn signals, or other lamps, may be used as the localization signal emitters. The resulting localization signal may be coded or non-coded. The emitting vehicle may also provide a concurrent or synchronous wireless message that includes the associated vehicle identification code. Here, an imaging device 811 such as a camera is configured with lenses 812 to view around the first vehicle and thereby to detect or record a localization signal emitted by another vehicle. In this case, the localization signal comprises a single brief pulse of all four turn signal lamps, synchronized with a wireless message that includes the identification code of the emitting vehicle. The imaging device 811 is configured to image the visible-light localization signal from the turn-signal flash along with the vehicle that emitted it, thereby localizing that vehicle and associating it with the received identification code.

The imaging device 811, or an associated processor, may be configured to discriminate the visible-light localization signal from all other light flashes. For example, any brief flash that is not synchronous with the wireless message may be rejected as background noise. Secondly, the visible-light localization signal may be configured to have a specified duration such as 100 milliseconds, and a specified range such as +/−10 milliseconds, thereby enabling the system 800 to reject other light pulses that may occur. If some other brief flash happens to occur at the same time as the visible-light localization signal, then the system 800 can detect two simultaneous pulses from different directions. If only one of the pulses is coming from a vehicle, as opposed to something in the environment, the receiving vehicle can reject the false signal and determine that the flash that came from a vehicle is the correct localization signal. However, if two flashes are imaged at the same time, and are proximate to two different vehicles, with both pulses being coincident with the wireless message, then the first vehicle may not be able to determine which vehicle is associated with the wireless message, and therefore can reject the event and send a wireless message requesting that the vehicle again emit the localization signal. In this way, each vehicle can determine the position of each other vehicle in view, and can associate each vehicle's identification code with it. An advantage of the system 800 configuration may be economy, since it uses the already existing lights on each vehicle; hence a separate visible or infrared emitter is not needed, and a separate infrared imager is not needed, and a separate high-speed pulse detector is likewise not needed.

Figure 9:
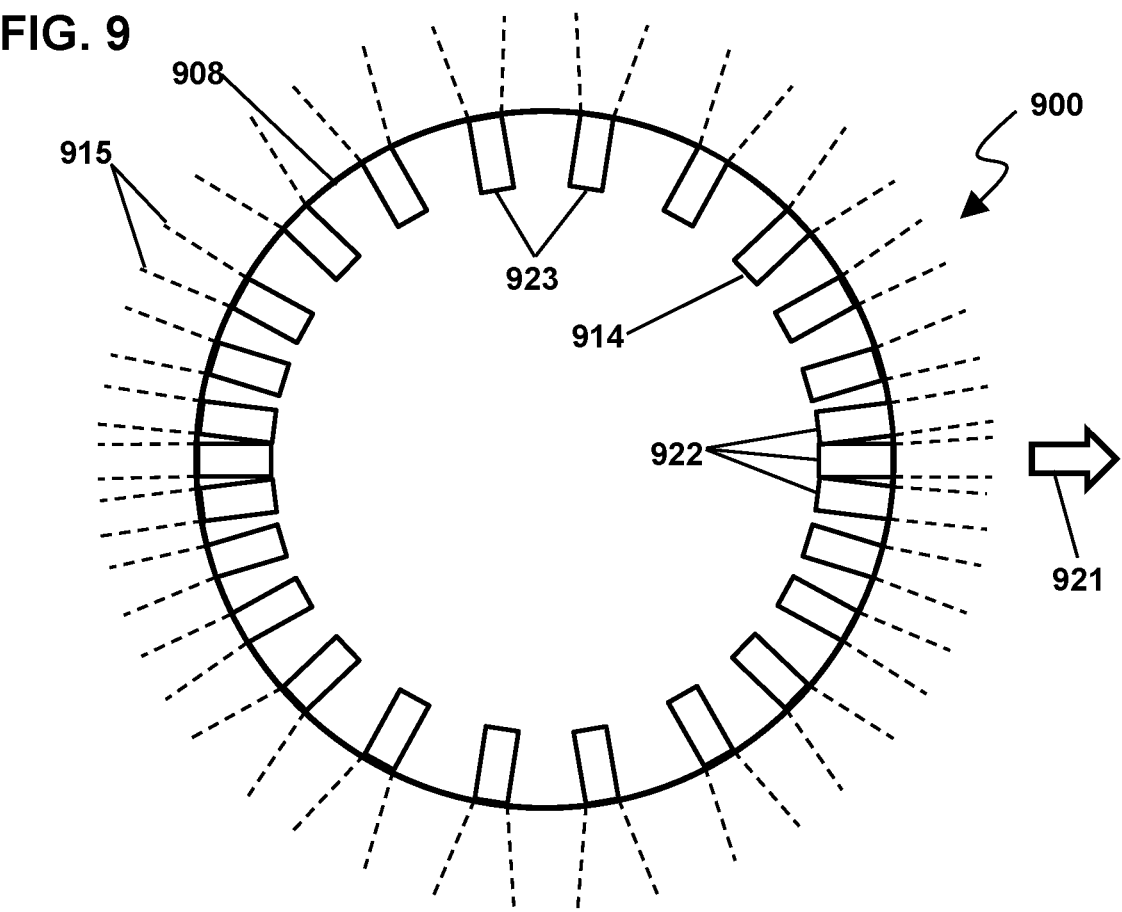
FIG. 9 is a top-view cross-section sketch showing the distribution of localization signal detectors arranged around a circular enclosure.

FIG. 9 is a notional top-view cross-section sketch of an exemplary directional detector 900 for detecting localization signals and determining their directions. The depicted system 900 comprises a large number of sensor components 914 mounted on a circular frame 908 and aimed at different horizontal directions and configured to detect the wavelength and timing of localization signal pulses. Each sensor component 914 has a limited field of view indicated by dashed lines 915, so that an arriving localization signal is observable in only one of the sensor components 914 (or perhaps divided between two adjacent sensor components 914). The direction of the emitting vehicle is thus determined by which of the sensor components detected the localization signal, and if two adjacent sensor components 914 detected the same localization signal, the direction of the vehicle may be determined by averaging or other combination of the two detecting sensor components 914.

Typically in traffic, vehicles are clustered in the front and rear directions relative to a first vehicle, with few if any vehicles on either side. Therefore, the directional detector 900 may be configured with sensor components 914 being distributed about the periphery in a non-uniform way, specifically with forward-viewing sensor components 922 being arranged more densely and/or with narrower field of view than the side-viewing sensor components 923. The frontward direction is indicated by an arrow 921. In this way, vehicles in front and behind the system 900 can be discerned and localized even when densely clustered, as in a multilane highway.

Figure 10:
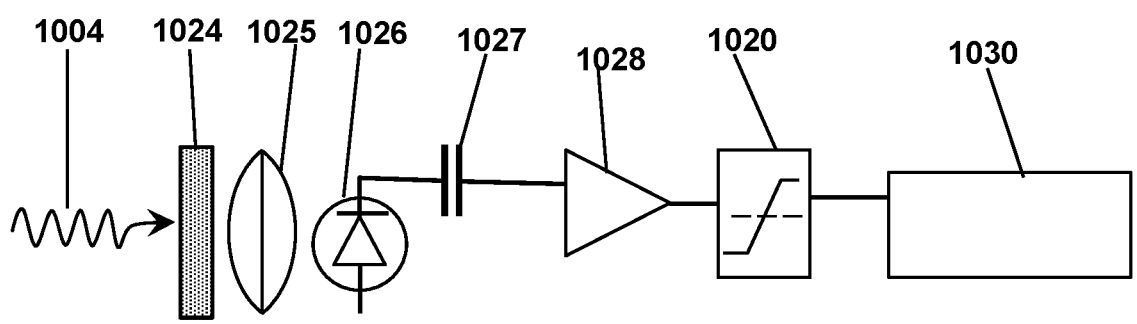
FIG. 10 is a notional schematic of a circuit for detecting pulse-coded localization signals.

FIG. 10 is a notional circuit schematic of one of the sensor components 914 of FIG. 9. A localization signal symbolized as an electromagnetic wave 1004 is incident on an optical filter 1024 configured to pass wavelengths that include the localization signal 1004. A lens 1025 focuses the energy onto a biased photodiode 1026, causing a current flow that transits through a high-pass or other electronic filter 1027 which may be configured to admit frequencies corresponding to the pulses of a coded or non-coded localization signal while blocking other frequencies such as noise and backgrounds. Then a gain stage, such as an operational amplifier 1028, amplifies the rapid signal, and a voltage discriminator 1020 or the like can sharpen the shape and timing of the detected pulses. A processor such as a microcontroller 1030 can then record the pulse or pulses, and can indicate that the localization signal 1004 has been detected. Also, if the localization signal 1004 includes an embedded vehicle code, the microcontroller 1030 may be configured to decode it.

Figure 11:
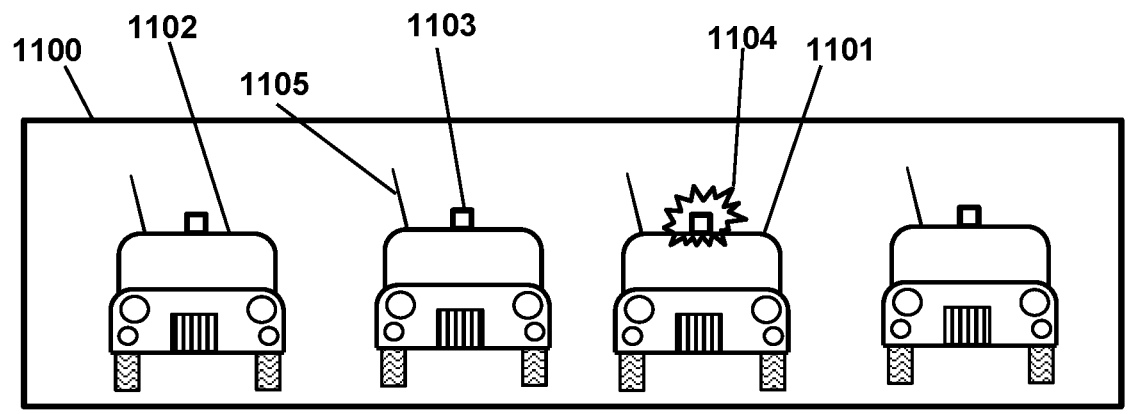
FIG. 11 is a sketch showing several vehicles in which one is emitting an exemplary localization pulse.

FIG. 11 is a notional sketch of an exemplary image 1100 obtained by an imaging device such as a camera, configured to record both a localization signal and the emitting vehicle in the same image. In the image 1100, four cars 1102 are seen, each with a localization signal emitter 1103 and a wireless transmitter 1105. One of the cars 1101 is emitting a localization signal 1104 which appears along with the emitting vehicle 1101 in the image 1100. The imaging device thus determines which of the vehicles 1101-1102 is emitting the localization signal 1104. Also, if a vehicle identification code is provided in a concurrent wireless message or encoded in the localization signal 1104, then the vehicle identification code can be associated with the particular vehicle 1101 that emitted the localization signal.

Figure 12:
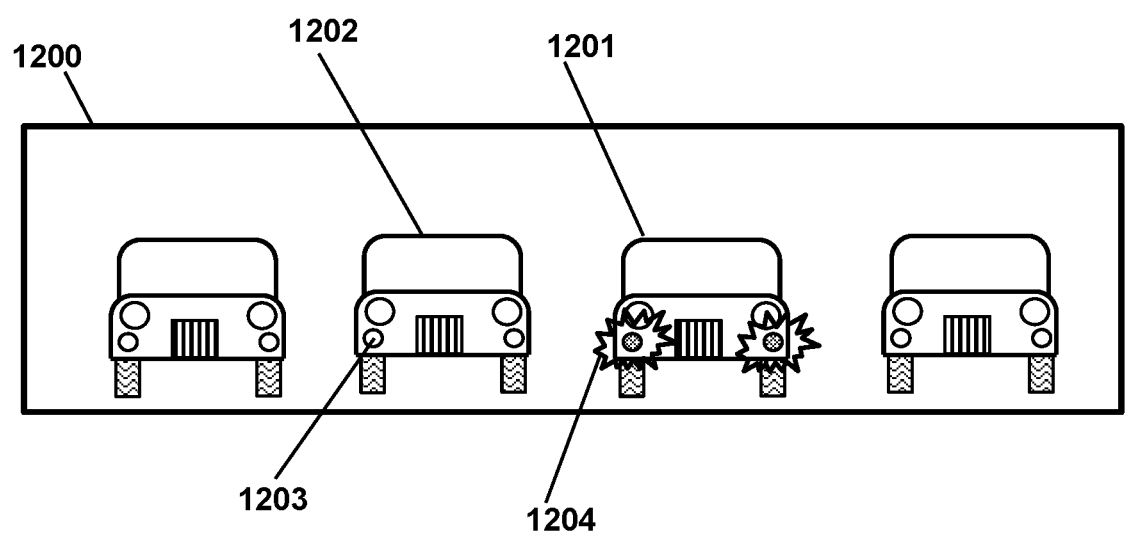
FIG. 12 is a sketch showing several vehicles in which one is emitting an exemplary visible-light localization pulse.

FIG. 12 is a notional sketch of an exemplary image 1200 wherein four vehicles 1202 are seen. Each vehicle 1202 includes turn signal lamps 1203. A particular vehicle 1201 is shown emitting a visible-light localization signal 1204 comprising a brief visible-light flash from its turn signal lamps 1203. In this way, other vehicles can observe and/or image the surrounding vehicles, detect the visible-light localization signal, and thereby determine which vehicle is emitting a visible-light localization signal 1204. In some embodiments, the visible-light localization signal 1204 may include a vehicle identification code encoded therein, in which case other vehicles may decode the visible-light localization signal 1204 and thereby determine which identification code is associated with the emitting vehicle 1201. In other embodiments, the emitting vehicle 1201 may transmit a wireless message synchronously with the visible-light localization signal 1204, wherein the wireless message includes the vehicle identification code, in which case other vehicles may detect the visible-light localization signal 1204 and the synchronous wireless message, and thereby determine which identification code is associated with the emitting vehicle 1201.

Figure 13:
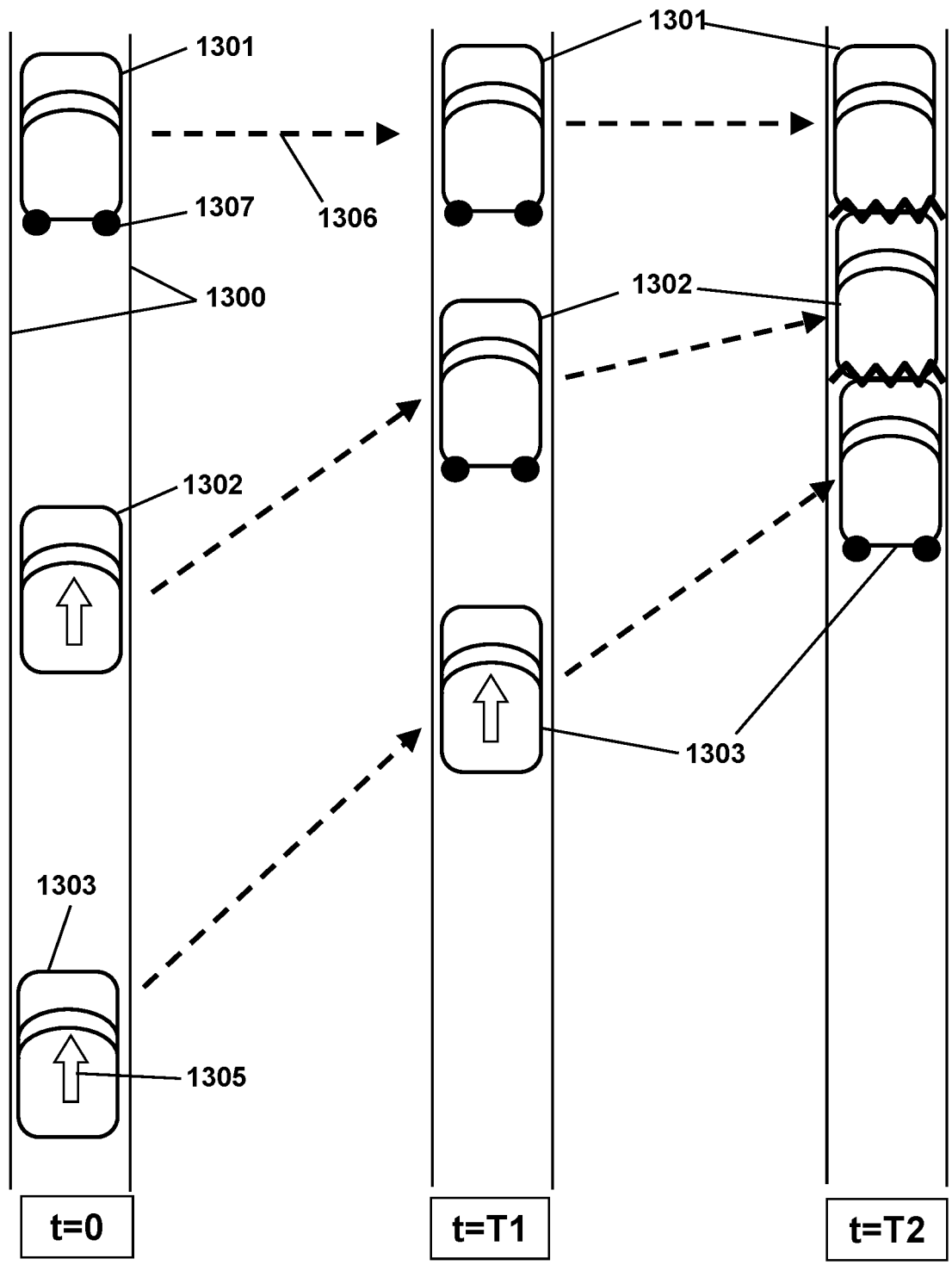
FIG. 13 is a sketch showing sequential positions of three cars in a traffic lane at successive times in which a collision occurs.

FIG. 13 is a schematic showing how a collision scenario may proceed according to prior art, in which the vehicles do not have localization systems such as those disclosed herein. Each vehicle may be autonomous, or human-driven, or human-driven but with an automatic emergency intervention system that operates the vehicle to mitigate an imminent collision, or human-driven with an automatic assistant such as a lane-keeping assistant. However, in each case the vehicles have no way to identify and localize the other vehicles. Consequently, little or no cooperation can be arranged, even in an emergency. The depicted scenario involves successive views of three cars at three successive times. The scenario ends in a needless collision.

At time t=0, in a lane of traffic demarked by lines 1300, there are shown three automobile icons representing a leading vehicle 1301, a subject vehicle 1302, and a following vehicle 1303. A block arrow such as 1305 indicates when each vehicle is moving; and when the vehicle is stopped, there is no arrow. Brake lights 1307 show when each vehicle is braking.

The traffic lane is repeated at three sequential times indicated as t=0, t=T1, and t=T2. For example, T1 may be 1 second and T2 may be 2 seconds. Dashed arrows such as 1306 show how each vehicle's position shifts at each time. Thus, the figure shows how each car moves during the scenario.

Initially, at t=0, the leading vehicle 1301 has suddenly stopped. The subject vehicle 1302 and the following vehicle 1303 are travelling forward because their drivers or autonomous controllers have not yet realized that the leading vehicle 1301 has stopped.

At time T1, the driver or controller of the subject vehicle 1302 has detected that the leading vehicle 1301 has stopped, and is bringing the subject vehicle 1302 to a stop as rapidly as possible. Meanwhile, the following vehicle 1303 is still traveling forward, but now the following driver or controller sees that the subject vehicle 1302 has stopped and finally applies the brakes in panic.

At time T2, the subject vehicle 1302 has collided with the leading vehicle 1301, and the following vehicle 1303 has collided with the subject vehicle 1302, all because there was insufficient time at freeway speeds for each vehicle to stop. As will be demonstrated below, the collisions could have been avoided if the vehicles had been configured with suitable means for identifying each other spatially.

Figure 14:
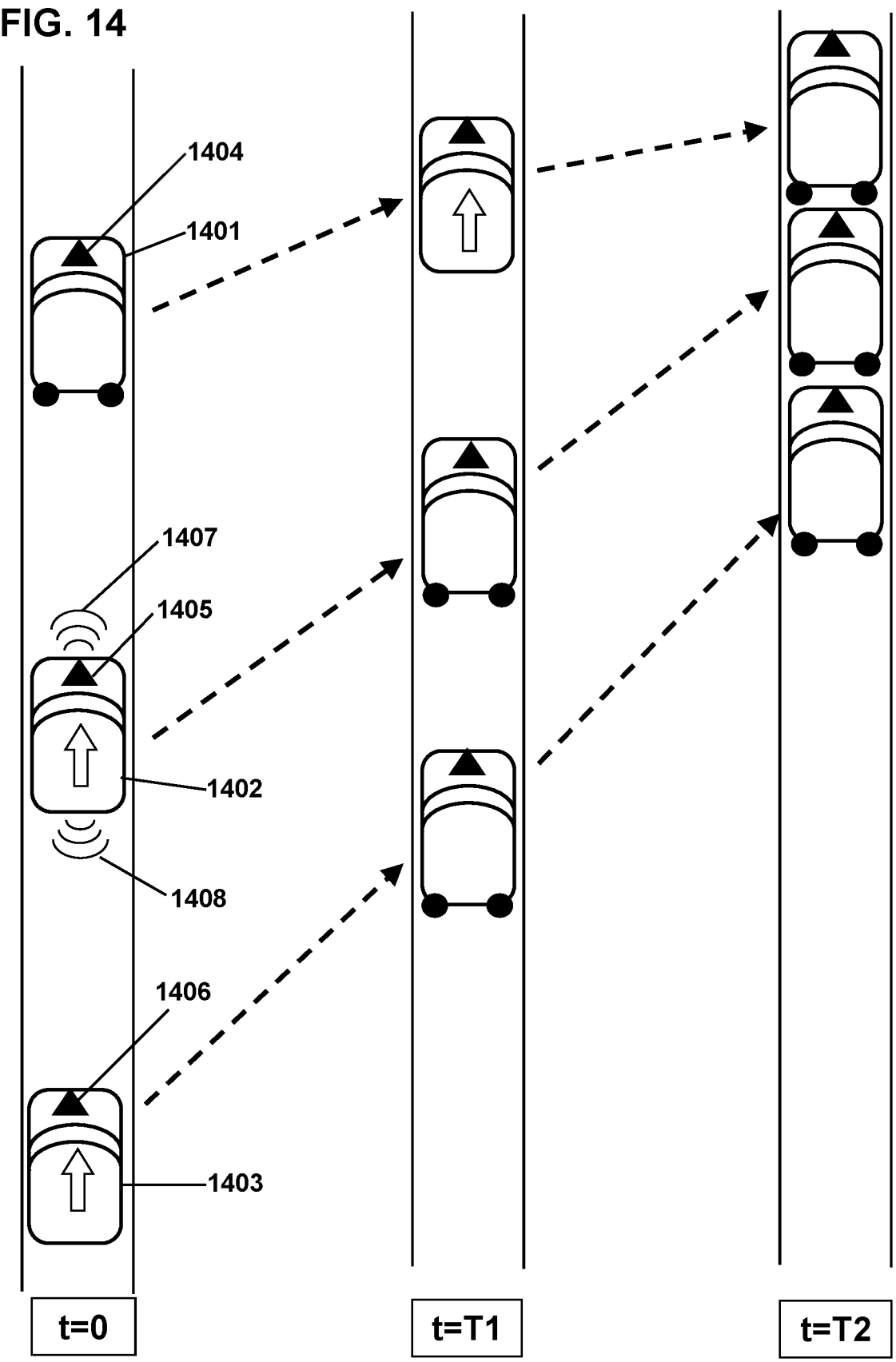
FIG. 14 is a sketch showing sequential positions of three cars in a traffic lane at successive times, in which a collision is avoided.

FIG. 14 shows a similar scenario, but now the vehicles include localization systems according to the present disclosure. By cooperating, they manage to avoid the collisions.

The leading vehicle 1401, the subject vehicle 1402, and the following vehicle 1403 are in a travel lane. All three vehicles 1401-1403 may be autonomously operated. All three vehicles 1401-1403 include localization systems 1404, 1405, and 1406, respectively. The localization systems 1404-1406 may be configured to detect and identify and localize the other vehicles 1401-1403 as soon as they are within range, by methods described elsewhere herein. In the depicted scenario, all three vehicles have determined each other's identification and relative positions before t=0.

At t=0, the leading vehicle 1401 has suddenly stopped. The subject vehicle 1402 determines that a collision is imminent and, using the previously-determined identification codes and positions of the other two vehicles, transmits wireless messages 1407 and 1408 to the leading 1401 and following 1403 vehicles respectively. Message 1407 is a request to the leading vehicle 1401 to move forward to avoid being hit from behind, and message 1408 is a request to the following vehicle 1403 to immediately brake strongly to avoid colliding with the subject vehicle 1402.

At t=T1, the leading vehicle 1401 is shown moving forward, the subject vehicle strongly braking 1402, and the following vehicle 1403 is also braking strongly in response to the messages 1407-1408.

At t=T2, all three vehicles 1401-1403 have successfully stopped, very close but with no collision. This example of collision avoidance was possible because the localization systems 1404-1406 established which vehicle 1401-1403 was in which position. Without knowing which vehicle is in which position, the messages 1407-1408 could not have been directed at the appropriate recipients, particularly since the two messages 1407-1408 make opposite requests (accelerating versus braking in this case). Without the benefit of localization, the vehicles could have misinterpreted the messages 1407-1408, in which case the leading vehicle 1401 could have obeyed the braking message 1408, and the following vehicle 1403 could have obeyed the accelerating message 1407, leading to a double collision. By determining which vehicle was in front and which was behind the subject vehicle 1402, and by determining the vehicle identification codes of each vehicle 1401-1403, the subject vehicle 1402 was able to specify that the first message 1407 was intended for the leading vehicle 1401, and the second message 1408 was intended for the following vehicle 1403, thereby ensuring that the correct action would be taken by each vehicle, and thereby avoiding the collisions.

Figure 15:
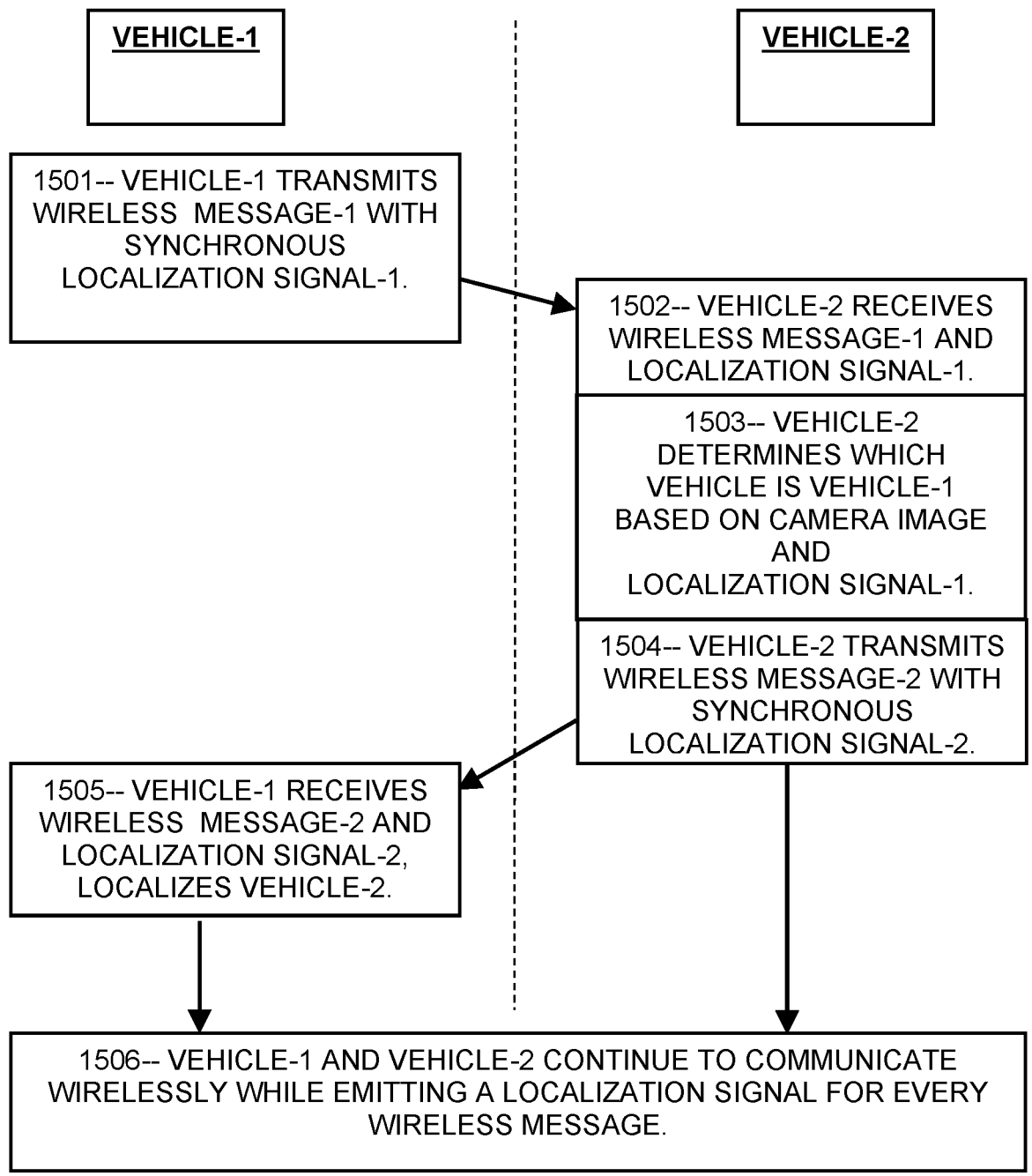
FIG. 15 is a flowchart showing an exemplary method for two vehicles to exchange messages synchronized with localization pulses.

FIG. 15 is a flowchart showing an exemplary localization procedure in which each vehicle emits a localization signal synchronously with each wireless message (termed Mode-1 above). Vehicle identification codes are not included in this example, although the vehicles may have them and exchange them aside from the steps shown here. The actions of vehicle-1 are shown on the left and vehicle-2 on the right.

First 1501 vehicle-1 transmits a first wireless message and, at the same time or otherwise synchronously, emits a first localization signal such as a visible or infrared pulse. Vehicle-2 then 1502 receives the first wireless message and the first localization signal, and determines 1503 which vehicle, of several proximate vehicles, is the vehicle-1 based on a camera image that shows the first localization signal while the first wireless message was received. Vehicle-2 then 1504 transmits a second wireless message synchronously with a second localization signal. These are received 1505 by the vehicle-1, which thereby localizes vehicle-2. Thereafter 1506 the vehicles may continue to communicate wirelessly, while continuing to emit localization signals synchronously with each wireless message, thereby indicating which vehicle is associated with each wireless message. If the other proximate vehicles transmit wireless messages, they may emit synchronous localization signals in the same way, thereby avoiding any confusion as to which vehicle is transmitting each message.

Figure 16:
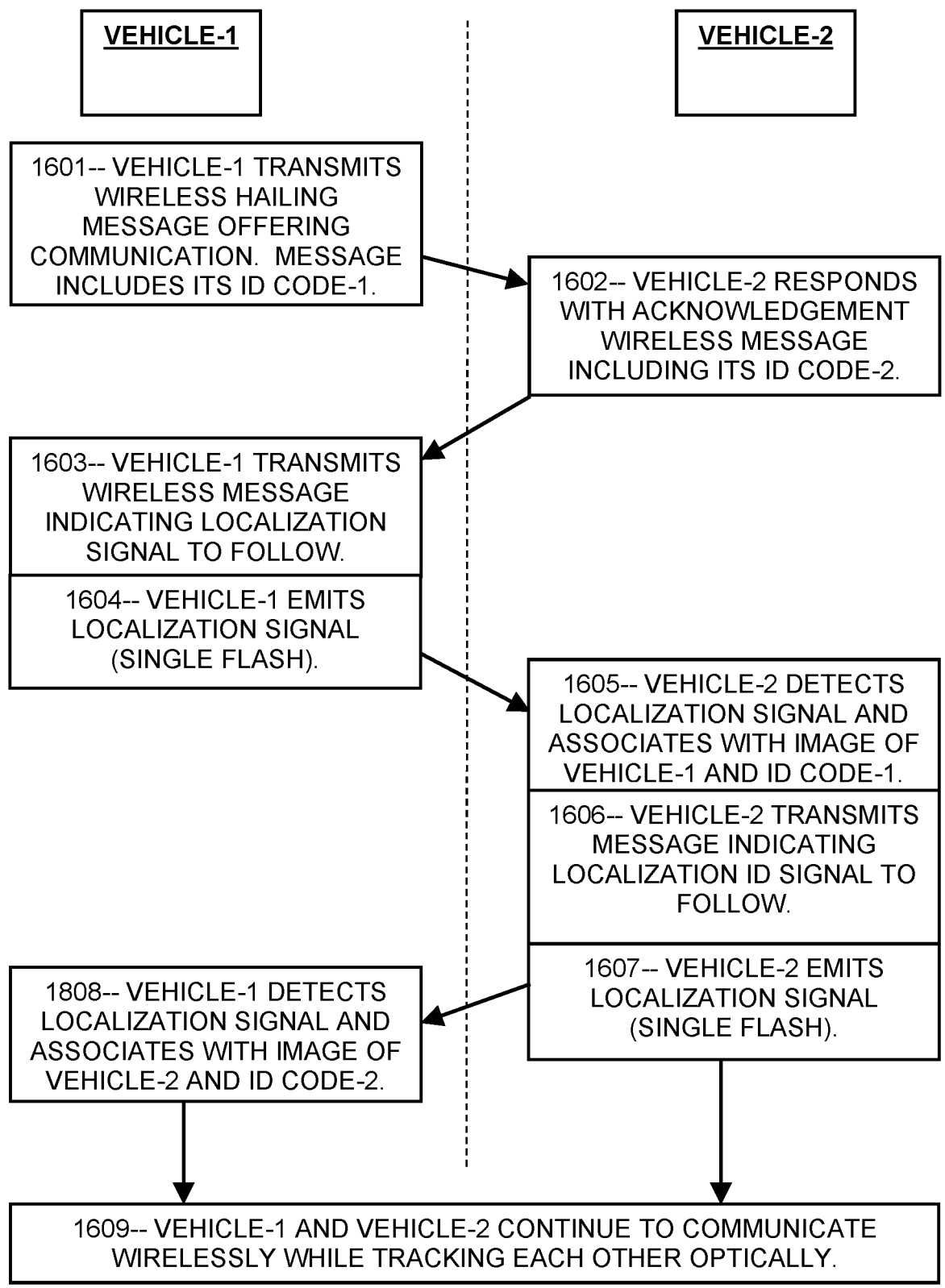
FIG. 16 is a flowchart showing an exemplary method for two vehicles to spatially localize each other.

FIG. 16 is a flowchart showing an exemplary Mode-2 localization procedure in which multiple wireless messages are exchanged in preparation for the localization signal. The actions of vehicle-1 are shown on the left and vehicle-2 on the right. First 1601, vehicle-1 initiates the localization procedure by "hailing" other vehicles, that is, by transmitting a wireless message that identifies vehicle-1 as an autonomous vehicle and requests a mutual localization procedure with any vehicles in range. Each vehicle-1 message includes vehicle-1's unique identification code ("code-1" in this example). Then 1602, vehicle-2 responds with a wireless message indicating that it too is autonomous, and in the same message providing its identification code-2. Then 1603, vehicle-1 sends another wireless message indicating that it is about to emit a localization signal, thereby indicating the location of vehicle-1. Then 1604, vehicle-1 emits a non-coded localization signal, such as a single infrared pulse. Since the vehicle identification code was provided in a wireless message, it is not necessary to embed the identification code-1 in the localization signal. Also, the localization signal is synchronized with a vehicle-1 message, thereby associating the code-1 with vehicle-1. Then 1605, vehicle-2 detects vehicle-1's localization signal using, for example, an imaging device sensitive to the type of energy in the localization signal, such as an infrared-sensitive camera in this example, thereby localizing vehicle-1 and associating it with code-1.

Then 1606, vehicle-2 transmits a wireless message indicating that vehicle-2's localization signal is forthcoming, along with vehicle-2's identification code-2. Vehicle-2 then 1607 emits a localization signal such as another infrared pulse. Then at 1608, vehicle-1 detects vehicle-2's localization signal using an infrared camera for example, thereby localizing vehicle-2 spatially and associating vehicle-2 with identification code-2. Thereafter 1609, vehicle-1 and vehicle-2 can track each other optically using, for example, image analysis, or by radar, or other suitable means for following the positions of vehicles. The vehicles can thereby cooperate with each other using the knowledge of where each of the vehicles is located. With such cooperation, collisions can be avoided and/or minimized, and traffic can be facilitated generally.

If vehicle-1 moves outside of vehicle-2's field of view, for example due to a truck passing between them, then vehicle-2 can initiate another localization procedure to re-localize vehicle-1, or vice-versa. Either vehicle can transmit localization hailing messages at any time, such as when additional vehicles come into range or appear visually, thereby localizing each vehicle within range.

Figure 17:
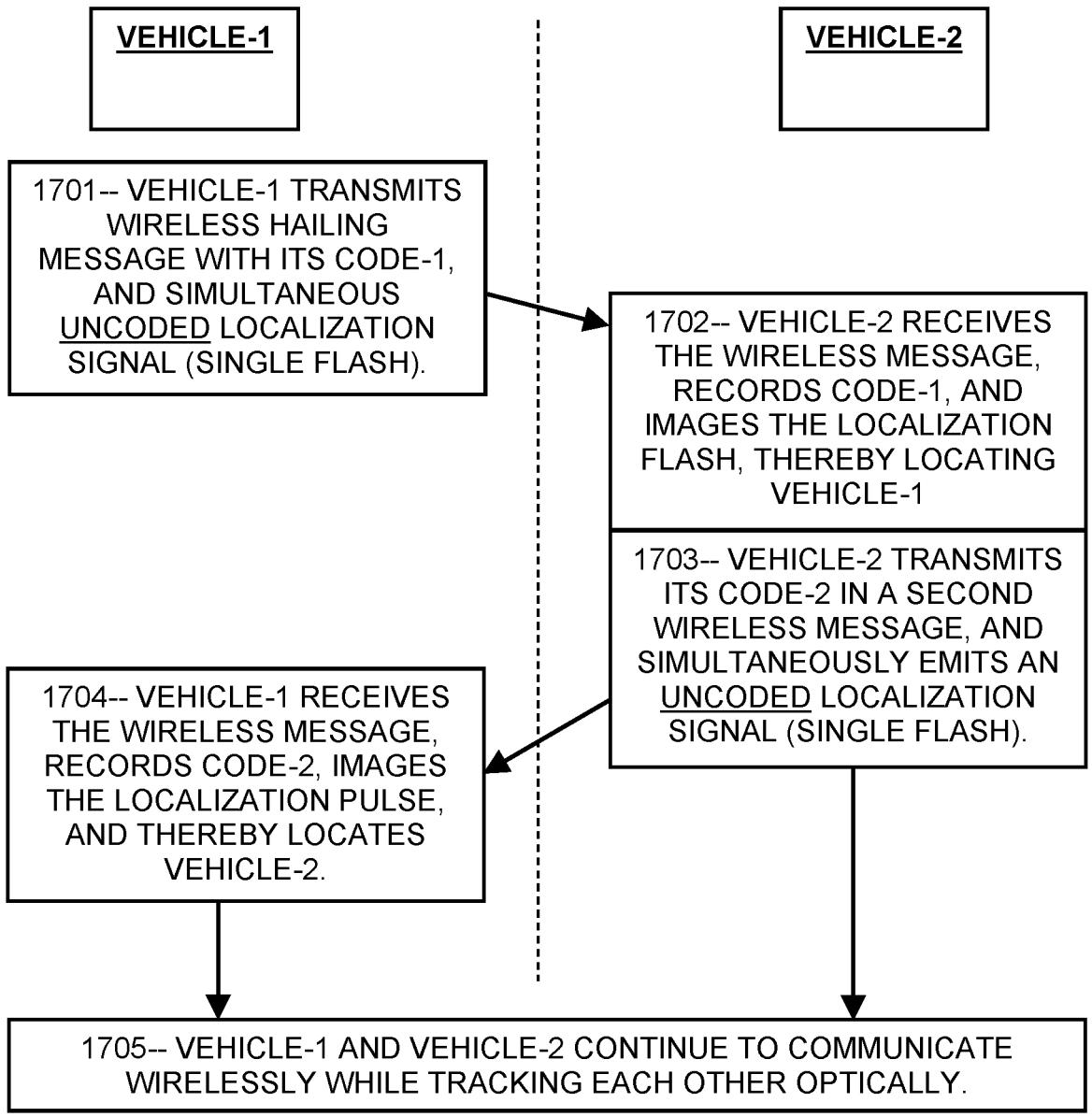
FIG. 17 is a flowchart showing an alternative exemplary method for two vehicles to spatially localize each other.

FIG. 17 is a flowchart showing a simpler exemplary localization procedure, in which the vehicle identification is provided in a single wireless message instead of back-and-forth handshaking. First 1701, vehicle-1 transmits a wireless hailing message that includes its identification code-1, and simultaneously emits a non-coded localization signal such as a single infrared pulse. Then 1702, vehicle-2 receives the wireless message and images the localization signal using, for example, an infrared camera. Vehicle-2 records the code-1 and the position of vehicle-1, thereby localizing vehicle-1. Then 1703, vehicle-2 transmits a wireless message with its code-2 and simultaneously emits a non-coded localization signal such as an infrared pulse. Then 1704, vehicle-1 receives the wireless message and the localization pulse from vehicle-2, thereby localizing it. Thereafter 1705, the two vehicles can collaborate with knowledge of their relative positions.

Figure 18:
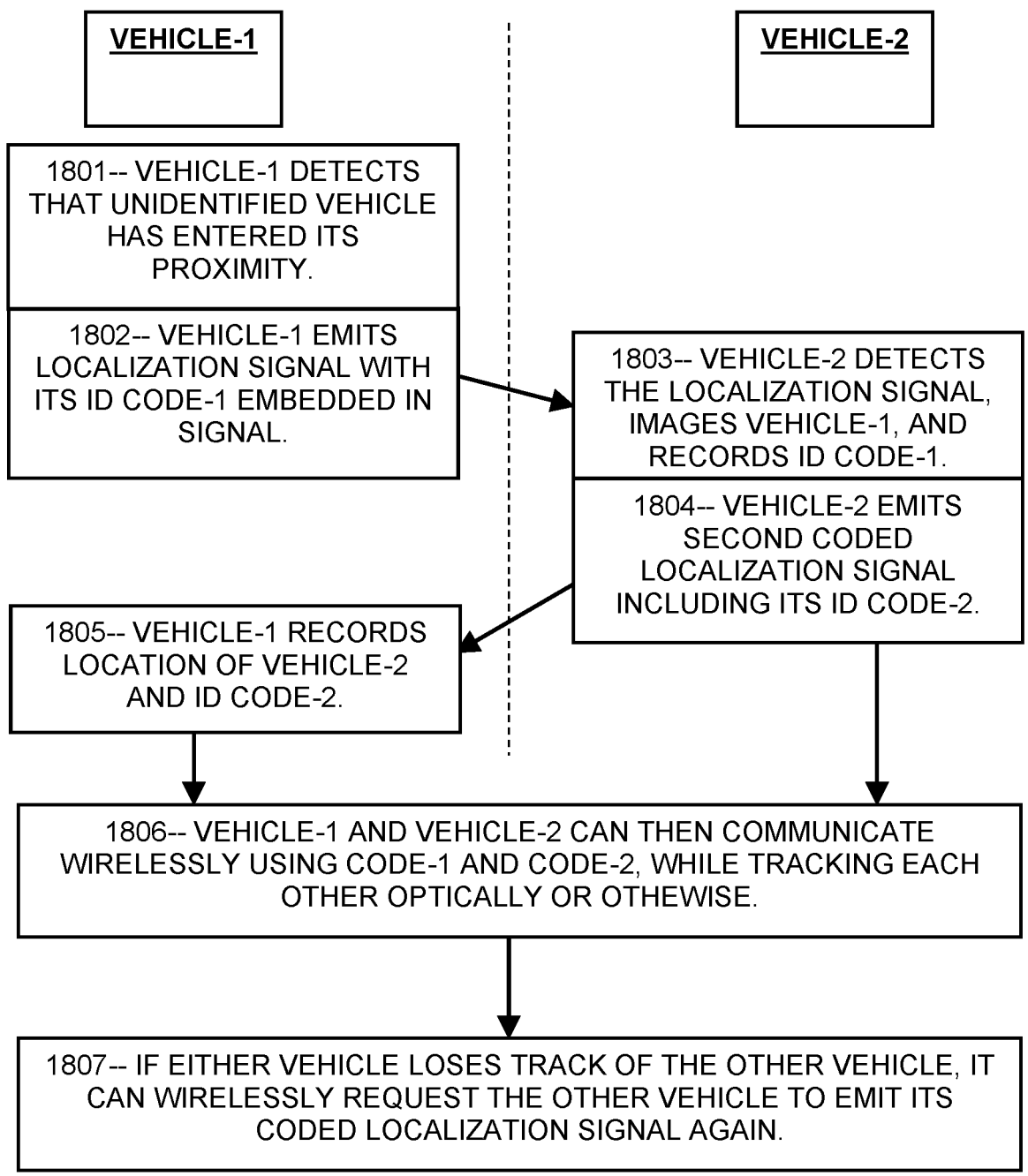
FIG. 18 is a flowchart showing another alternative exemplary method for two vehicles to spatially localize each other.

FIG. 18 is a flowchart showing another exemplary localization procedure, in which the identification code is embedded in the localization signal rather than a wireless message (Mode-3). First 1801, vehicle-1 detects that an unidentified vehicle-2 has entered its proximity. Then 1802, vehicle-1 emits a coded localization signal, such as a series of infrared pulses with its identification code-1 embedded therein. Then 1803, vehicle-2 detects the localization signal, and images vehicle-1 along with the localization signal, thereby determining the location of vehicle-1 as well as its identification code-1. Then 1804, vehicle-2 emits a coded localization signal that includes its identification code-2, and 1805 vehicle-1 receives that signal while imaging vehicle-2, thereby localizing vehicle-2 in association with its identification code-2. Thereafter 1806, the vehicles can communicate wirelessly using the known identification code-1 and code-2, while continuously tracking the other vehicle by optical imaging, or radar, or other suitable tracking means. And 1807, either vehicle can request another localization signal wirelessly if the tracking is interrupted. An advantage of this version may be that it avoids cluttering the radio bandwidth with unnecessary wireless messages, since no wireless messages are involved until one of the vehicles has a need for communication. Another advantage may be that the range is self-limiting, in that any pair of vehicles that cannot see the other vehicle's localization signal would be considered out of range.

The localization procedure may be configured to avoid signal contention or overlap, a situation in which two vehicles attempt to transmit wireless messages or localization signals at the same time. For example, signal contention can occur if vehicle-1 transmits a hailing message and two other vehicles respond at the same time. To avoid such interference, each vehicle may be configured to wait for a random or pseudorandom waiting interval after receiving the hailing message, and then to respond if no other vehicle has responded sooner. (Random and pseudo-random are treated as equivalent herein.) In that way, overlap is largely prevented. If a vehicle is prepared to respond to the hailing message, but is forced to withhold its response due to interference, then the withholding vehicle may wait until the in-progress localization procedure has concluded, and may then respond. In addition, to avoid creating a second contention situation, the withholding vehicle may provide a second waiting period. For example, after detecting that the in-progress localization procedure has concluded, the withholding vehicle may then wait an additional random interval, and then may initiate its response if a third vehicle has not already done so. Thus, the randomized waiting intervals can avoid cascaded contention and interference.

The random or pseudorandom waiting intervals may be arranged according to a random-number algorithm executed by a processor, such as a calculation that selects a number of milliseconds of waiting time, or otherwise. The algorithm that provides the random interval may be configured to populate the random intervals uniformly within a predetermined range of waiting times, such as between 1 second and 2 seconds. Such a predetermined interval, during which an event can be triggered, is sometimes called a "gate".

The vehicles may be configured to adjust their random waiting intervals according to various conditions. For example, if a vehicle has been forced to withhold its response to a hailing message, that vehicle may then shorten its random waiting interval on the next try, thereby increasing the likelihood that it can beat the other vehicles. Each vehicle may be configured to initially start with a rather long waiting interval such as between 500 and 1000 milliseconds, on the first attempt. Then, if the vehicle is prevented from responding due to other messages starting first, the withholding vehicle may shorten the next random waiting interval to between 250 and 500 milliseconds. After each successive inhibition, the vehicle may halve its range of random waiting intervals, and continue likewise until the withholding vehicle is finally able to initiate communication without interference. In this way, each vehicle is likely to have a turn, and the vehicles that have waited longest automatically become the first in line for the next attempt. After finally completing a full localization procedure, each vehicle may restore its random waiting range back to the initial long setting, so that other waiting vehicles can then have their turn.

The vehicles may be configured to complete the full localization procedure in a short time, such as 0.1 or 1 or 10 or 100 milliseconds using, for example, fast electronic and optical components. In most traffic situations, even if dozens or hundreds of other vehicles are in range, most or all of the vehicles within range may then be able to complete their localization procedures in 1 second or a few seconds, typically. In addition, if each vehicle is configured to embed its identification code in the localization signal rather than in wireless messages, the period of contention may be extremely short, such as only 50-100 microseconds in some embodiments, by emitting a correspondingly brief localization signal.

Figure 19:
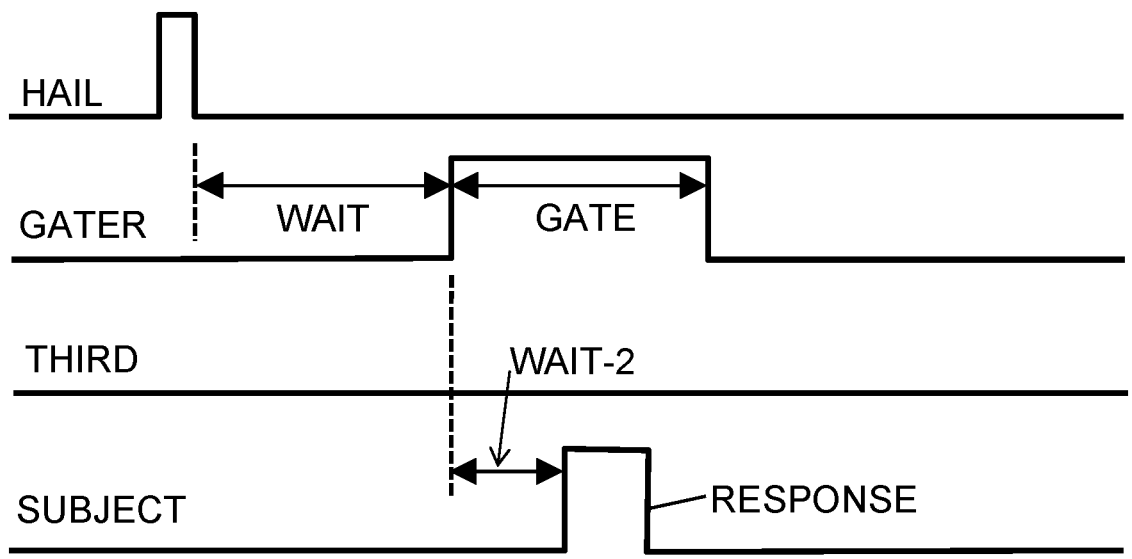
FIG. 19 is a schematic sketch showing time traces such as oscilloscope traces for various steps of an exemplary localization process.

FIG. 19 is a schematic chart showing the timing of various actions pertaining to a first vehicle's response to another vehicle's hailing message. The horizontal axis is time, and each line or item represents an action or a demarked time interval. In the first line, the first vehicle transmits a hailing message during a time indicated by the pulse marked HAIL. The line marked GATER represents an electronic clock in the first vehicle that is configured to wait, after the end of the hailing message, for a predetermined time interval WAIT, and then to open a gate interval GATE during which the first vehicle can respond to the hailing message if no interference is present. A third vehicle is present as indicated by the line THIRD; however, the third vehicle remains silent in this case; hence the line marked THIRD is flat. The first vehicle then responds to the hailing message at a random (or pseudo-random or otherwise computed) moment within GATE. In summary, the first vehicle avoids interference with other vehicles by waiting for the predetermined WAIT interval, thereby giving other vehicles a chance to respond. In addition, the first vehicle may wait a second random interval after the GATE has opened, to avoid pile-up that could occur if multiple vehicles all initiated messages at the end of the predetermined WAIT interval. The second interval is marked WAIT-2.

Figure 20:
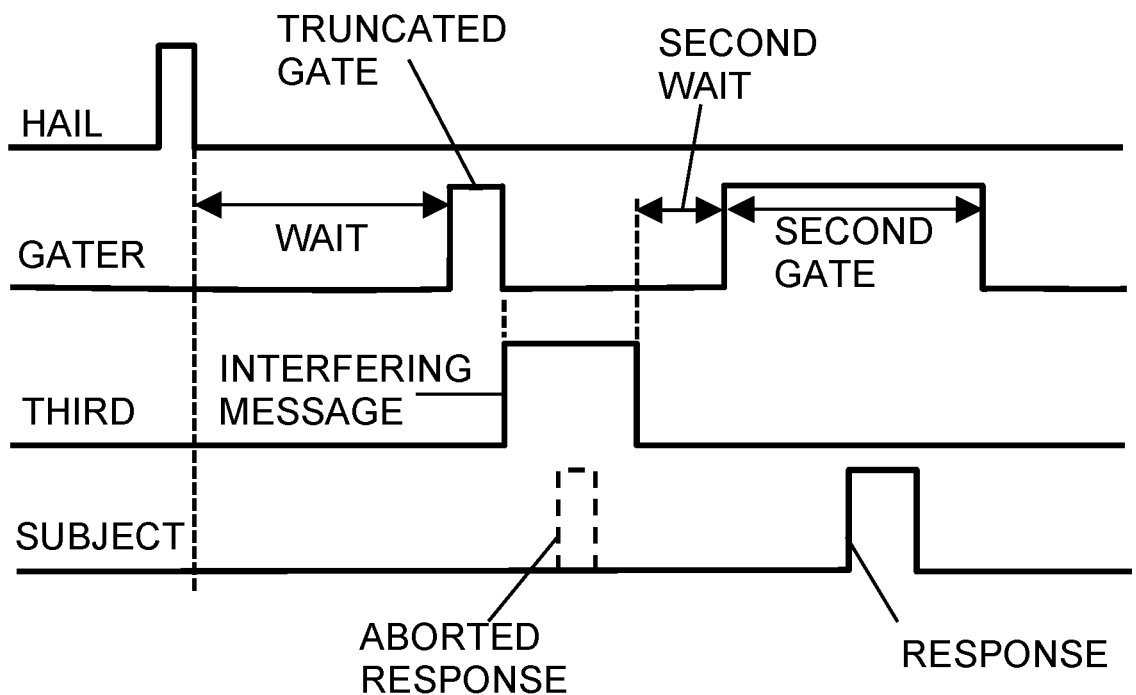
FIG. 20 is a schematic sketch showing time traces such as oscilloscope traces for various steps of another exemplary localization process.

FIG. 20 is a similar schematic, but this time the third vehicle begins transmitting before the subject vehicle does, and therefore the subject vehicle had to abort its response and wait until the intruding vehicle had finished. The HAIL message is shown in the first line. The first vehicle's timing is shown in the second line GATER, starting with the predetermined WAIT interval and then opening a gate. However, in this example, the third vehicle begins transmitting a message while the first vehicle's gate is open but before the first vehicle has started transmitting. Therefore, the first vehicle, detecting the interference, immediately closed its gate interval, which is labeled as TRUNCATED GATE for that reason.

After the interfering message has completed, the subject vehicle then prepares another predetermined delay labeled SECOND WAIT. Since the first vehicle was forced to withhold its message, the SECOND WAIT interval is shorter than the original WAIT interval. The first vehicle then opens another gate interval labeled SECOND GATE, during which a response may be transmitted at some random moment. The last line shows, in dash, the originally planned response message labeled ABORTED RESPONSE, which was aborted due to the interference. The final message, labeled RESPONSE, was then transmitted within the SECOND GATE. The SECOND WAIT interval is configured to be shorter than the original WAIT interval so that the first vehicle would have an increased likelihood of being able to start its RESPONSE before another vehicle begins transmitting. The first vehicle initially started with a relatively long WAIT interval so that other vehicles could have a chance, particularly those other vehicles that were previously forced to withhold their responses. The first vehicle then prepares successively shorter wait intervals after each aborted response, to increase the likelihood that it will be able to transmit. The intent of the successively shorter wait intervals is to give the first vehicle an advantage relative to other vehicles that have not had to withhold their messages, but not to gain advantage relative to the vehicles that have already withheld their messages longer than the first vehicle. If all the vehicles adopt the same standards for the waiting and gating intervals, the method provides that each vehicle will get a turn, with those waiting the longest getting successively higher priority in timing.

In some embodiments, the initial hailing message may contain information that would allow other vehicles to filter their response. It may not make sense to try to localize certain other vehicles, or even to attempt communication with them. For example, the hailing message may include the hailing vehicle's identification code, so that other vehicles that have already localized that hailing vehicle can ignore the message. For example, "Hail, other vehicles! I'm ABC123. Please respond if you have not already done so." Other vehicles that have already localized ABC123 could then ignore the message.

In other embodiments, the hailing message may indicate the direction of travel of the transmitting vehicle, such as "Hail, other vehicles! I'm traveling north. Please respond if you are too." Other vehicles that are traveling in the opposite direction may ignore the message, since the two vehicles will likely be out of range soon and there is no reason to attempt to localize each other.

In a similar way, the hailing message may contain information about the road being traveled, such as "I'm traveling north on route 15 in lane 1." Then another vehicle which is proximate but is on another road, such as an access road, may ignore the message as not relevant. Likewise, another vehicle that is traveling in the same direction on the same road, but widely separated from the hailing vehicle may elect to ignore the message, for example a hailing vehicle in lane 4 and a responding vehicle in lane 1 may be so far apart that localizing would be pointless. Vehicles in HOV lanes may decline to communicate with vehicles in non-HOV lanes, or vice-versa, since these lanes are supposed to be separate (other than crossover sections). On the other hand, there may be circumstances in which vehicles on crossing roads would benefit from mutual localization, such as when two surface streets intersect at a stop sign or a traffic light for example. A vehicle approaching the intersection may hail a vehicle on the cross street to ensure that the crossing vehicle is out of the way before the first vehicle expects to arrive at the intersection, and many similar situations. Thus, the vehicles may be configured to adjust their criteria for responding to hailing messages according to the type of road, with different thresholds and conditions applicable to freeway driving versus surface streets, and dense city traffic versus rural roads, for example.

In addition, the vehicles may adjust their criteria for accepting or ignoring other vehicles' hailing messages according to the traffic density. For example, if the number of other vehicles in range is large, such as over 10 or 20 or 50 other vehicles, then the vehicles may discard the messages of other vehicles that are farthest away, or of those vehicles that are judged to be less of a hazard.

Figure 21:
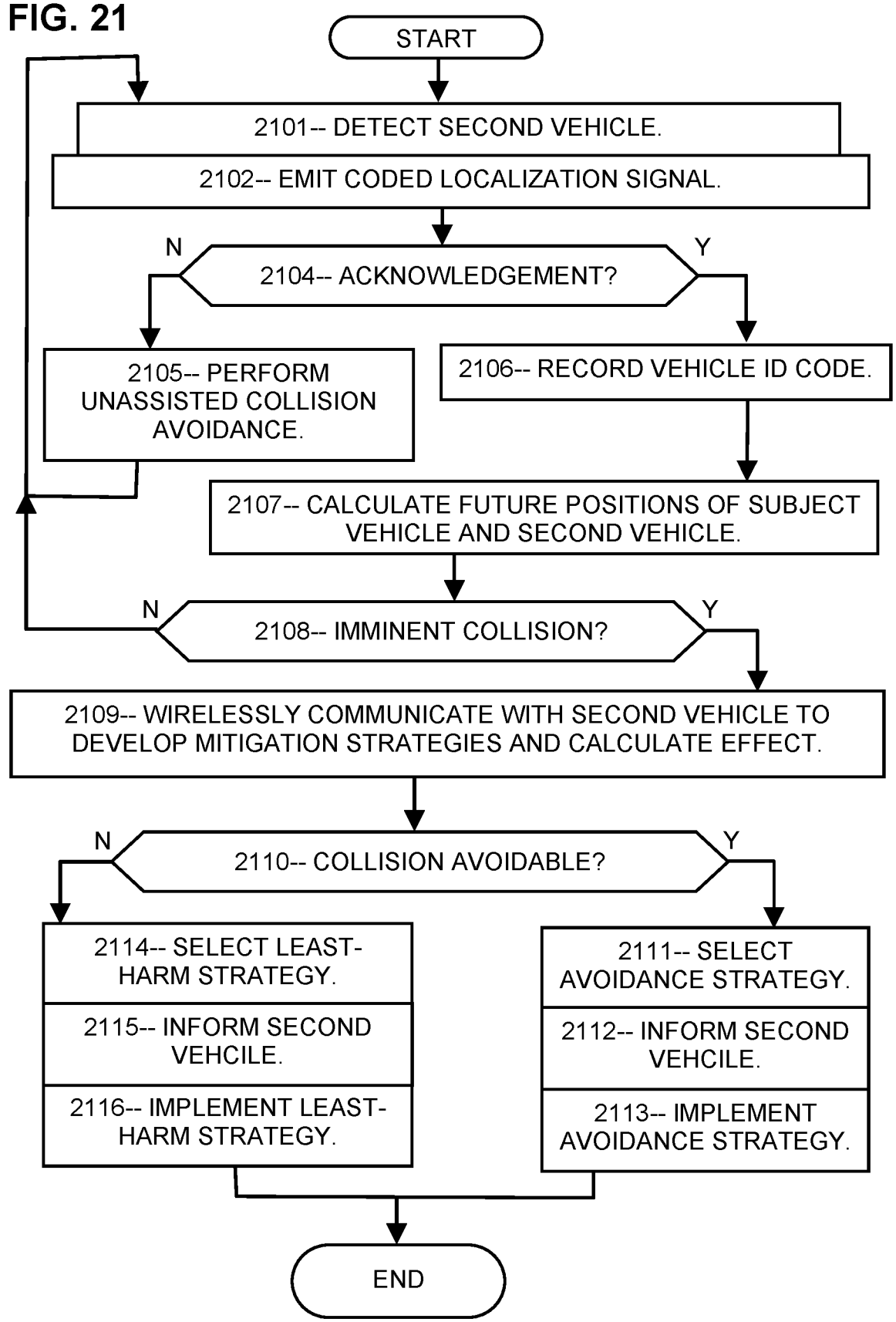
FIG. 21 is a flowchart showing an exemplary method whereby two vehicles can cooperate to avoid a collision.

FIG. 21 is a flowchart showing an exemplary method for mitigating an imminent collision. The method includes cooperation between the first vehicle and a second vehicle if possible. If cooperation is not possible, the first vehicle takes action independently. In either case, the first vehicle prepares a plurality of sequences of actions, each action being a steering and/or braking and/or positively accelerating action, and then determines which sequence will avoid the collision. If none of the sequences will avoid the collision, then the first vehicle calculates the amount of harm caused by each projected collision according to the various sequences, and then implements the sequence that results in the least harm.

First 2101, the first vehicle detects the second vehicle using, for example, sensors. In this example, the second vehicle is not yet a hazard, and there is plenty of time for the vehicles to exchange information. The first vehicle then 2102 attempts to engage the second vehicle by emitting a coded localization signal, with the first vehicle's identification code embedded in the signal. If 2104 the first vehicle receives no acknowledgement, it then performs 2105 an unassisted collision mitigation by selecting the best sequence of actions available. If, on the other hand, the first vehicle does receive an acknowledgement from the second vehicle at 2104, such as a coded localization signal, then the two vehicles are able to cooperate and to seek a better outcome. The first vehicle then 2106 records the second vehicle's identification code and notes the position of the second vehicle using, for example, an imaging device that detects both the localization signal and the second vehicle, such as a camera configured to detect both visible and infrared light.

The first vehicle then 2107 calculates future positions of the first and second vehicle and 2108 determines if the vehicles are projected to collide. If not, the system resumes scanning the traffic for other hazards. If the vehicles are projected to collide, the two vehicles begin to wirelessly communicate 2109 to develop mitigation strategies. For example, both vehicles' processors can devise and analyze sequences of actions designed to avoid the collision, and to determine 2110 whether the collision can be avoided by any of those sequences. If so, then 2111 one of the strategies that avoids the collision is selected and mutually communicated 2112. The vehicles then 2113 mutually implement the avoidance strategy by carrying out their respective sequences of actions. For example, one of the vehicles may begin accelerating while the other vehicle decelerates so as to avoid the collision. If, on the other hand, the collision is unavoidable by any of the strategies, then 2114 the two vehicles mutually calculate the harm expected according to each of the sequences of actions, and select the particular strategy that is projected to cause the least harm in the subsequent collision. The two vehicles can then 2115 communicate to synchronize their actions, and 2116 implement the least-harm strategy. In addition, the vehicles can continue to communicate and assist each other after an unavoidable collision.

Figure 22:
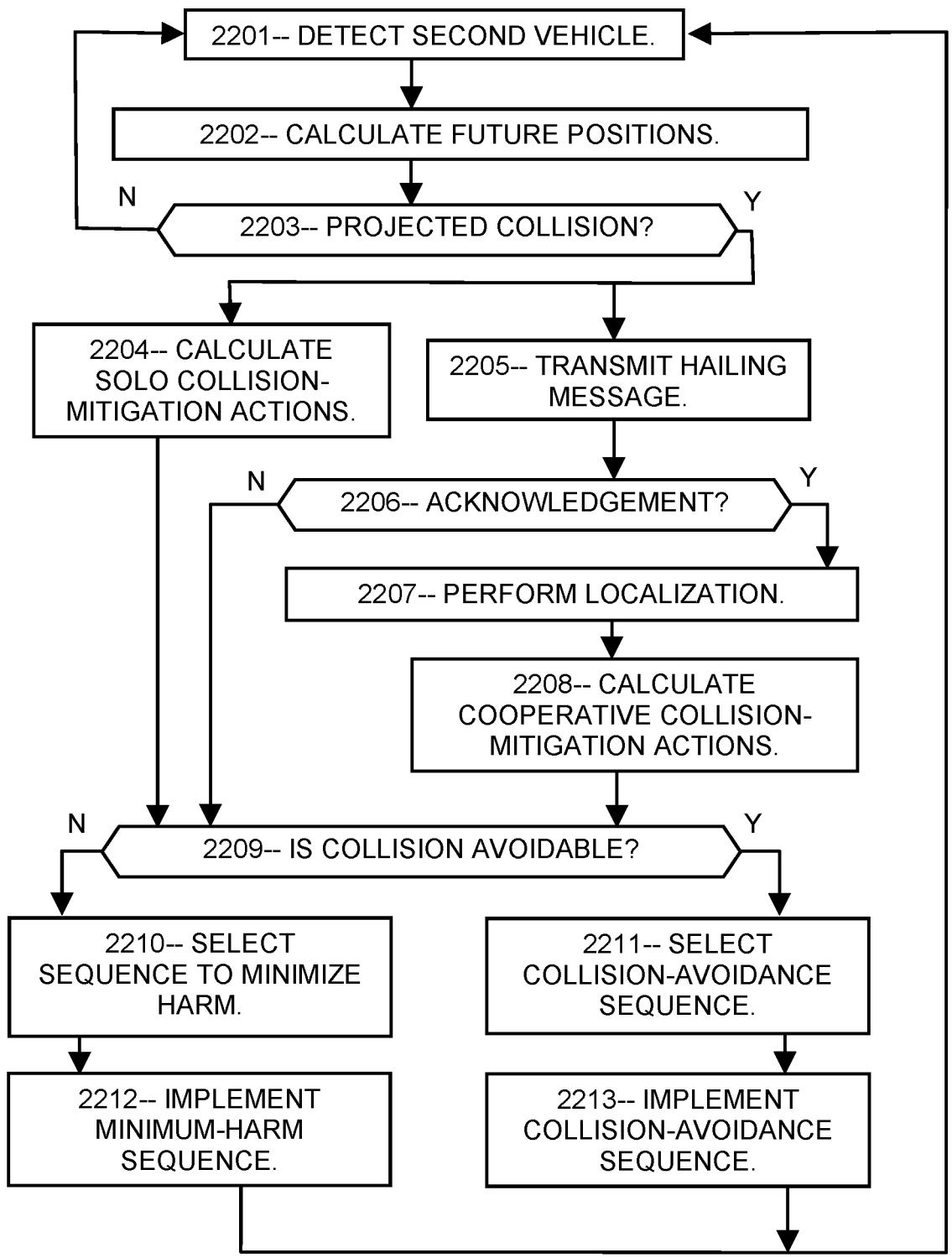
FIG. 22 is a flowchart showing an alternative exemplary method whereby two vehicles can cooperate to avoid a collision.

FIG. 22 is a flowchart showing a similar localization procedure, but now an imminent collision is detected first, and then a rapid localization procedure is carried out to enable cooperation. First 2201 the first vehicle detects a second vehicle and 2202 calculates future positions of the two vehicles and determines 2203 whether they are projected to collide. If not, the flow returns to the beginning to continue watching the second vehicle and any other vehicles in view. But if a collision is projected, then the first vehicle may initiate two parallel tasks, to calculate 2204 a sequence of actions to mitigate the collision without cooperation, and 2205 to transmit a hailing message seeking urgent communication with the second vehicle. If the second vehicle acknowledges the hailing message 2206, then the two vehicles quickly perform the localization procedure 2207 as described hereinabove, and calculate various actions they may cooperatively take 2208 to avoid or minimize the collision. If, however, no acknowledgement is received at step 2206, the first vehicle continues to calculate solo unassisted collision-avoidance and collision-minimization actions 2204. In either case, the first vehicle then 2209 determines whether the collision is avoidable if any of the collision-mitigations actions have been projected to avoid the collision, and unavoidable otherwise. If the collision is unavoidable, then the first vehicle (possibly in collaboration with the second vehicle or other vehicles at risk) may select 2210 a particular sequence of actions to minimize the harm of the unavoidable collision, and then may implement 2212 the selected sequence. If, however, at least one of the sequences of actions is projected to avoid the collision, then 2211 the first vehicle (possibly in collaboration) selects one of the collision-avoidance sequences and 2213 implements it. Then, flow returns to the beginning 2201 to resume watching for other threats.

When the first vehicle has succeeded in localizing and identifying the other vehicles around it, the first vehicle and the other communicating vehicles can collaboratively devise the collision-mitigation sequence and can implement the sequence cooperatively. The sequence of actions may include some actions to be carried out by the first vehicle and other actions to be carried out by the second vehicle; for example, one vehicle braking while the other vehicle accelerates. Likewise, the sequence of actions may include actions for three vehicles, which may include vehicles not directly involved in the projected collision. For example, a vehicle in a lane adjacent to the first vehicle may be requested to brake or swerve so that the first vehicle can dash into the adjacent lane and avoid hitting the leading vehicle. The cooperative sequence of actions may include timing parameters, such as two vehicles braking at the same time, or one vehicle braking only after another vehicle has pulled one car length ahead, for example.

If, on the other hand, a collision is imminent and the other vehicle cannot establish communication or localization with the first vehicle, then the first vehicle may proceed to select and implement the best "solo" or unassisted sequence of actions to mitigate the collision, since there are no other options available. In general, a collaborative mitigation in which both vehicles take coordinated action to avoid a collision is likely to be more successful than a solo or unassisted mitigation effort. For that reason, the localization and identification systems and methods disclosed herein are expected to reduce traffic collisions, and to minimize any unavoidable collisions that occur, and to save lives.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the vehicle, an inserted memory chip, hard drive, flash drives, flash memory, optical media, magnetic media, or any other type of file—storing medium. The outputs may be delivered to a user by way of signals transmitted to vehicle steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where vehicle controls are contemplated, the plural inputs may allow plural users to input relevant data at the same time.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for autonomous vehicles to avoid a collision, the method comprising:
   a) detecting, by a first autonomous vehicle, based on sensors mounted in or on the first autonomous vehicle, a second vehicle;
   b) determining, by a processor of the first autonomous vehicle, that a collision between the first and second autonomous vehicles is imminent;
   c) transmitting, by a transmitter of the first autonomous vehicle, a first wireless message indicating a wireless address of the first autonomous vehicle and requesting assistance from the second autonomous vehicle;
   d) emitting, by an emitter of the first autonomous vehicle, a first infrared signal simultaneously with the first wireless message;
   e) receiving, by a receiver of the first autonomous vehicle, a second wireless message from the second autonomous vehicle, the second wireless message indicating a wireless address of the second autonomous vehicle;
   f) detecting, by one or more infrared detectors in or on the first autonomous vehicle, a second infrared signal emitted by the second autonomous vehicle;
   (g) determining, by the one or more infrared detectors in or on the first autonomous vehicle, a direction of arrival of the second infrared signal; and
   h) determining, by the processor of the first autonomous vehicle, according to the direction of arrival of the second infrared signal, which particular vehicle, among multiple vehicles proximate to the first autonomous vehicle, is the second autonomous vehicle.

2. The method of claim 1, further comprising determining, by a processor of the first autonomous vehicle, a first series of actions and a second series of actions, wherein the collision can be avoided when the first autonomous vehicle performs the first series of actions and the second autonomous vehicle performs the second series of actions.

3. The method of claim 1, further comprising determining, by a processor of the first autonomous vehicle, a first series of actions and a second series of actions, wherein a harm of the collision can be minimized when the first autonomous vehicle performs the first series of actions and the second autonomous vehicle performs the second series of actions.

4. The method of claim 3, wherein the first wireless message comprises the second series of actions and a request that the second autonomous vehicle perform the second series of actions.

5. The method of claim 3, further comprising transmitting, by the transmitter of the first autonomous vehicle, a third wireless message comprising the second series of actions and a request that the second autonomous vehicle perform the second series of actions.

6. The method of claim 3, further comprising receiving, by the receiver of the first autonomous vehicle, a third wireless message from the second autonomous vehicle, the third wireless message comprising either:
   a) an acknowledgement and an agreement to perform the second series of actions; or
   b) a proposal to perform a third series of actions different from the second series of actions.

7. The method of claim 3, further comprising performing, by the first autonomous vehicle, the first series of actions while the second autonomous vehicle performs the second series of actions, thereby avoiding the collision or minimizing the harm of the collision.

8. A system for avoiding a traffic collision, the system comprising:
   a) a first autonomous vehicle comprising:
      i) a first wireless transceiver;
      ii) a first infrared emitter;
      iii) a first directional infrared detector; and
      iv) a first processor;
   b) and a second autonomous vehicle comprising:
      i) a second wireless transceiver;
      ii) a second infrared emitter;
      iii) a second directional infrared detector; and
      iv) a second processor;
   c) wherein:
      i) the first wireless transceiver is configured to transmit a first wireless message while the first infrared emitter emits a first infrared signal;
      ii) the second wireless transceiver is configured to transmit a second wireless message while the second infrared emitter emits a second infrared signal;
   d) and wherein:
      i) the first directional infrared detector is configured to determine a direction of arrival of the second infrared signal;
      ii) the second directional infrared detector is configured to determine a direction of arrival of the first infrared signal;
   e) and wherein:
      i) the first processor is configured to determine, according to the direction of arrival of the second infrared signal, which vehicle, among multiple vehicles in traffic, is the second autonomous vehicle; and
      ii) the second processor is configured to determine, according to the direction of arrival of the first infrared signal, which vehicle, among multiple vehicles in traffic, is the first autonomous vehicle.

9. The system of claim 8, wherein the first autonomous vehicle further comprises a visible-light camera configured to form an image of the vehicles in traffic.

10. The system of claim 9, wherein the first processor is further configured to identify the second autonomous vehicle by comparing the direction of arrival of the second infrared pulse to the image of the vehicles in traffic.

11. The system of claim 8, wherein:
   a) the first autonomous vehicle further comprises a camera sensitive to both visible and infrared light; and wherein
   b) the camera is configured to acquire an image that includes both the second infrared signal and the vehicles in traffic.

12. The system of claim 11, wherein the first processor is further configured to determine, according to the image that includes both the second infrared signal and the vehicles in traffic, which vehicle is the second autonomous vehicle.

13. The system of claim 8, wherein the second autonomous vehicle further includes an internal speaker configured to produce a sound responsive to receiving the first wireless message.

14. The system of claim 13, wherein the sound comprises computer-generated speech, comprising an emergency announcement that a human, in the second autonomous vehicle, can understand.

15. An emergency intervention system comprising non-transitory computer-readable media in a processor of a first vehicle, the non-transitory computer-readable media containing instructions that, when executed by a computing environment, cause a method to be performed by the first vehicle, the method comprising:
   a) while the first vehicle is being driven by a human, automatically receiving an emergency wireless message from a second vehicle, the emergency wireless message indicating an imminent collision;
   b) simultaneously with receiving the emergency wireless message, detecting an infrared signal from the second vehicle;
   c) determining, according to a direction of arrival of the infrared signal, a direction toward the second vehicle;
   d) comparing the direction of arrival of the infrared signal to an image from a visible-light camera of the first vehicle, and thereby determining which particular vehicle in traffic is the second vehicle;
   e) responsive to receiving the emergency wireless message, activating an emergency intervention system of the first vehicle; and
   f) under control of the emergency intervention system, autonomously performing a series of actions configured to avoid the imminent collision when possible, and to minimize a harm of the imminent collision when avoidance is not possible.

16. The emergency intervention system of claim 15, wherein the series of actions is calculated by a processor of the first vehicle based on the emergency wireless message and on the determining which particular vehicle in traffic is the second vehicle.

17. The emergency intervention system of claim 15, wherein the series of actions is specified in the emergency wireless message.

18. The emergency intervention system of claim 15, wherein a processor of the first vehicle is configured to:
   a) measure, according to sensors of the first vehicle, a trajectory of the second vehicle; and
   b) calculate, according to the trajectory of the second vehicle, one or more changes to the series of actions.

19. The emergency intervention system of claim 18, wherein the processor of the first vehicle is further configured to transmit a second wireless message to the second vehicle, the second wireless message indicating the changes to the series of actions.

* * * * *